(12) United States Patent
Decristofaro et al.

(10) Patent No.: US 7,235,910 B2
(45) Date of Patent: *Jun. 26, 2007

(54) SELECTIVE ETCHING PROCESS FOR CUTTING AMORPHOUS METAL SHAPES AND COMPONENTS MADE THEREOF

(75) Inventors: Nicholas J. Decristofaro, Chatham, NJ (US); Gordon E. Fish, Montclair, NJ (US); Scott M. Lindquist, Myrtle Beach, SC (US); Carl E. Kroger, Aynor, SC (US)

(73) Assignee: Metglas, Inc., Conway, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/423,791

(22) Filed: Apr. 25, 2003

(65) Prior Publication Data

US 2004/0212269 A1  Oct. 28, 2004

(51) Int. Cl.
*H02K 15/12* (2006.01)
*H02K 1/02* (2006.01)

(52) U.S. Cl. .................................. 310/216; 310/45

(58) Field of Classification Search ............... 310/216, 310/45; 428/611, 900; 29/596
See application file for complete search history.

(56) References Cited

U.S. PATENT DOCUMENTS

| | | | | |
|---|---|---|---|---|
| 4,187,441 | A | * | 2/1980 | Oney .......................... 310/112 |
| 4,197,146 | A | | 4/1980 | Frischmann .............. 148/31.55 |
| 4,201,837 | A | | 5/1980 | Lupinski ..................... 428/457 |

(Continued)

FOREIGN PATENT DOCUMENTS

DE  2805435  8/1979

(Continued)

OTHER PUBLICATIONS

International Search Report and Written Opinion issued Jun. 13, 2006 in PCT App. No. PCT/US04/12226.

*Primary Examiner*—Karl Tamai

(57) ABSTRACT

A selective etching process cuts shapes from amorphous metal strip feedstock. The etching process comprises depositing a chemically resistant material to one side of the strip in a pattern that defines the requisite shape, mating the metal strip with a carrier strip, exposing at least one side of the metal strip to an etching agent to selectively etch the desired shape, and separating the shape from the strip feedstock. A plurality of layers of the shapes is assembled by adhesive lamination to form a generally polyhedrally shaped bulk amorphous metal magnetic component useful in high efficiency electric motors and inductive devices. The bulk amorphous metal magnetic component may include an arcuate surface, and preferably includes two arcuate surfaces that are disposed opposite to each other. The magnetic component is operable at frequencies ranging from about 50 Hz to about 20,000 Hz. When the component is operated at an excitation frequency "f" to a peak induction level $B_{max}$, the component exhibits a core-loss less than about "L" wherein L is given by the formula $L=0.005\ f(B_{max})^{1.5}+0.000012\ f^{1.5}(B_{max})^{1.6}$, said core loss, said excitation frequency and said peak induction level being measured in watts per kilogram, hertz, and teslas, respectively. Performance characteristics of the bulk amorphous metal magnetic component of the present invention are significantly better than those of silicon-steel components operated over the same frequency range.

18 Claims, 11 Drawing Sheets

U.S. PATENT DOCUMENTS

| | | | |
|---|---|---|---|
| 4,219,355 A | 8/1980 | DeCristofaro et al. | 75/123 |
| 4,226,619 A | 10/1980 | Hatta et al. | 75/123 |
| 4,298,409 A | 11/1981 | DeCristofaro et al. | 148/108 |
| 4,343,347 A | 8/1982 | Liebermann et al. | 164/463 |
| 4,385,932 A | 5/1983 | Inomata et al. | 75/123 B |
| 4,403,401 A | 9/1983 | Rosenberry | 29/596 |
| 4,437,907 A | 3/1984 | Sato et al. | 148/31.55 |
| 4,447,750 A * | 5/1984 | Howlett et al. | 310/89 |
| 4,672,346 A | 6/1987 | Miyamoto et al. | 335/296 |
| 4,716,556 A | 12/1987 | Raskin et al. | 367/168 |
| 4,734,975 A | 4/1988 | Ballard et al. | 29/606 |
| 4,763,030 A | 8/1988 | Clark et al. | 310/26 |
| 4,766,378 A | 8/1988 | Danby et al. | 324/307 |
| 4,818,966 A | 4/1989 | Miyamoto et al. | 335/296 |
| 4,827,235 A | 5/1989 | Inomata et al. | 335/297 |
| 4,887,059 A | 12/1989 | Asano et al. | 335/281 |
| 4,892,773 A | 1/1990 | Chenoweth et al. | 428/121 |
| 5,061,897 A | 10/1991 | Danby et al. | 324/318 |
| 5,124,651 A | 6/1992 | Danby et al. | 324/318 |
| 5,134,771 A | 8/1992 | Lee et al. | 29/609 |
| 5,160,379 A | 11/1992 | Yoshizawa et al. | 148/108 |
| 5,252,877 A | 10/1993 | Sawa et al. | 310/214 |
| 5,258,681 A | 11/1993 | Hibino et al. | 310/214 |
| 5,270,595 A | 12/1993 | Wisner | 310/26 |
| 5,283,544 A | 2/1994 | Sakurai et al. | 335/297 |
| 5,495,222 A | 2/1996 | Abele et al. | 335/306 |
| 5,522,948 A | 6/1996 | Sawa et al. | 148/308 |
| 5,671,524 A | 9/1997 | Damsky et al. | 29/596 |
| 5,731,649 A | 3/1998 | Caamano | 310/216 |
| 5,754,085 A | 5/1998 | Danby et al. | 335/297 |
| 5,798,680 A | 8/1998 | Abele et al. | 335/301 |
| 5,873,954 A | 2/1999 | Liebermann et al. | 148/304 |
| 5,935,347 A | 8/1999 | Suzuki et al. | 148/121 |
| 5,963,117 A | 10/1999 | Ohashi et al. | 335/306 |
| 6,014,070 A | 1/2000 | Danby et al. | 335/296 |
| 6,043,583 A * | 3/2000 | Kurosawa et al. | 310/254 |
| 6,346,337 B1 | 2/2002 | DeCristofaro et al. | 428/692 |
| 6,348,275 B1 | 2/2002 | DeCristofaro et al. | 428/692 |
| 6,420,813 B1 | 7/2002 | DeCristofaro et al. | 310/216 |
| 6,462,456 B1 | 10/2002 | DeCristofaro et al. | 310/216 |
| 2001/0043134 A1 | 11/2001 | DeCristofaro et al. | 335/302 |
| 2002/0074885 A1 | 6/2002 | DeCristofaro et al. | 310/152 |
| 2006/0066433 A1* | 3/2006 | Decristofaro et al. | 336/212 |

FOREIGN PATENT DOCUMENTS

| | | |
|---|---|---|
| DE | 2805438 | 8/1979 |
| EP | 0058269 | 8/1982 |
| EP | A0 060 660 | 9/1982 |
| EP | 0430085 | 6/1991 |
| EP | 0 984 461 A2 | 3/2000 |
| EP | 1 004 888 A1 | 5/2000 |
| EP | 1 004 889 A2 | 5/2000 |
| EP | 1 004 889 A3 | 8/2000 |
| JP | 58-148418 | 9/1983 |
| JP | 58-148419 | 9/1983 |
| JP | 59-181504 | 10/1984 |
| JP | 61-131518 | 6/1986 |
| WO | WO 94/14994 | 7/1994 |
| WO | WO 95/21044 | 8/1995 |
| WO | WO 95/33596 | 12/1995 |
| WO | WO 96/00449 | 1/1996 |
| WO | WO 99/66624 | 12/1999 |
| WO | WO 00/28556 | 5/2000 |
| WO | WO 00/28640 | 5/2000 |
| WO | WO 01/48889 | 7/2001 |
| WO | WO 01/50483 | 7/2001 |
| WO | WO 01/61825 | 8/2001 |
| WO | WO 01/78088 | 10/2001 |
| WO | WO 01/84564 | 11/2001 |

\* cited by examiner

Section A-A

SELECTIVE ETCHING PROCESS FOR CUTTING AMORPHOUS METAL SHAPES AND COMPONENTS MADE THEREOF

BACKGROUND OF THE INVENTION

1. Field of the Invention

This invention relates to a process for producing cut shapes of amorphous metal, and more particularly, to a selective etching process for producing cut laminations that are bonded together to form a generally polyhedrally shaped, low core loss, bulk amorphous metal magnetic component useful in electric motors and inductive magnetic devices.

2. Description of the Prior Art

Magnetic components made from a plurality of stacked laminations of sheet-form magnetic materials are widely used in electric motors and in inductive devices such as transformers, ballasts, inductors, saturable reactors, and the like. The magnetic material is typically selected based on both the required device properties and economic considerations.

Non-oriented electrical steel is most frequently chosen for electric motor components. In variable reluctance motors and eddy current motors, the stators are made from stacked laminations. Both the stator and the rotor are made from stacked laminations in squirrel cage motors, reluctance synchronous motors and switched reluctance motors. Each lamination is typically formed by stamping, punching or cutting the mechanically soft, non-oriented electrical steel into the desired shape. The formed laminations are then stacked and bound to form rotors or stators that have the desired geometry, along with sufficient mechanical integrity to maintain their configuration during production and operation of the motor.

The stator and the rotor in a rotating electrical machine are separated by small gaps that are either: (i) radial, i.e., generally perpendicular the axis of rotation of the rotor, or (ii) axial, i.e., generally parallel to the rotation axis and separated by some distance. In a dynamoelectric machine, lines of magnetic flux link the rotor and stator by traversing the gaps. Electromagnetic machines thus may be broadly classified as radial or axial flux designs, respectively. The corresponding terms radial and axial gap designs are also used in the motor art. Radial flux machines are by far most common. The aforesaid punching and stacking methods are widely used for constructing rotors and stators for radial flux motors.

Although amorphous metals offer superior magnetic performance when compared to non-oriented electrical steels, they have long been considered unsuitable for use in bulk magnetic components such as the rotors and stators of electric motors due to certain physical properties and the ensuing impediments to fabrication. For example, amorphous metals are thinner and harder than non-oriented steel, and consequently cause fabrication tools and dies to wear more rapidly. The resulting increase in the tooling and manufacturing costs makes fabricating bulk amorphous metal magnetic components using such conventional techniques, such as punching and stamping, commercially impractical. The thinness of amorphous metals also translates into an increased number of laminations in the assembled components, further increasing the total cost of an amorphous metal rotor or stator magnet assembly.

Amorphous metal is typically supplied in a thin continuous ribbon having a uniform ribbon width. However, amorphous metal is a very hard material, making it very difficult to cut or form easily. Once annealed to achieve peak magnetic properties, amorphous metal ribbon becomes very brittle. This makes it difficult and expensive to use conventional approaches to construct a bulk amorphous metal magnetic component. The brittleness of amorphous metal ribbon may also cause concern for the durability of the bulk magnetic component in an application such as an electric motor.

Magnetic stators are subject to extremely high magnetic forces, which vary rapidly at the frequencies needed for high rotational speed. These magnetic forces are capable of placing considerable stresses on the stator material, and may damage an amorphous metal magnetic stator. Rotors are further subjected to mechanical forces due both to normal rotation and to rotational acceleration when the machine is energized or de-energized and when the loading changes, perhaps abruptly.

A limited number of non-conventional approaches have been proposed for constructing amorphous metal components. For example, U.S. Pat. No. 4,197,146 to Frischmann discloses a stator fabricated from molded and compacted amorphous metal flake. Although this method permits formation of complex stator shapes, the structure contains numerous air gaps between the discrete flake particles of amorphous metal. Such a structure greatly increases the reluctance of the magnetic circuit and thus the electric current required to operate the motor.

The approach taught by German Patents DE 28 05 435 and DE 28 05 438 divides the stator into wound pieces and pole pieces. A non-magnetic material is inserted into the joints between the wound pieces and pole pieces, increasing the effective gap, and thus increasing the reluctance of the magnetic circuit and the electric current required to operate the motor. The layers of material that comprise the pole pieces are oriented with their planes perpendicular to the planes of the layers in the wound back iron pieces. This configuration further increases the reluctance of the stator, because contiguous layers of the wound pieces and of the pole pieces meet only at points, not along full line segments, at the joints between their respective faces. In addition, this approach teaches that the laminations in the wound pieces are attached to one another by welding. The use of heat intensive processes, such as welding, to attach amorphous metal laminations will recrystallize the amorphous metal at and around the joint. Even small sections of recrystallized amorphous metal will normally increase the magnetic losses in the stator to an unacceptable level.

Another difficulty associated with the use of ferromagnetic amorphous metals arises from the phenomenon of magnetostriction. Certain magnetic properties of any magnetostrictive material change in response to imposed mechanical stress. For example, the magnetic permeability of a component containing amorphous materials typically is reduced and the core losses increased when the component is subjected to stress. The degradation of soft magnetic properties of the amorphous metal device due to the magnetostriction phenomenon may be caused by stresses resulting from any combination of sources, including: (i) magnetic and mechanical forces during the operation of the electric motor; (ii) mechanical stresses resulting from mechanical clamping or otherwise fixing the bulk amorphous metal magnetic components in place; or (iii) internal stresses caused by the thermal expansion and/or expansion due to magnetic saturation of the amorphous metal material. As an amorphous metal magnetic stator is stressed, the efficiency at which it directs or focuses magnetic flux is reduced, resulting in higher magnetic losses, reduced efficiency, increased heat production, and reduced power. The extent of this degradation may be considerable depending upon the particular amorphous metal material and the actual intensity of the stresses, as indicated by U.S. Pat. No. 5,731,649 ("the '649 patent"). The degradation of core loss is often expressed as a destruction factor, i.e., a ratio of the core loss actually exhibited by a finished device and the inherent core loss of the constituent material tested under stress-free, laboratory conditions.

Moreover, amorphous metals have far lower anisotropy energies than other conventional soft magnetic materials, including common electrical steels. As a result, stress levels that would not have a deleterious effect on the magnetic properties of these conventional metals have a severe impact on magnetic properties important for motor components, e.g. permeability and core loss. For example, the '649 patent further discloses that forming amorphous metal cores by rolling amorphous metal into a coil, with lamination using an epoxy, detrimentally restricts the thermal and magnetic saturation expansion of the coil of material, resulting in high internal stresses and magnetostriction that reduces the efficiency of a motor or generator incorporating such a core. In order to avoid stress-induced degradation of magnetic properties, the '649 patent discloses a magnetic component comprising a plurality of stacked or coiled sections of amorphous metal carefully mounted or contained in a dielectric enclosure without the use of adhesive bonding.

A number of applications in current technology, including such widely diverse areas such as high-speed machine tools, aerospace motors and actuators, and spindle drive motors for magnetic and optical disk drives used for data storage in computers and other microelectronic devices, require electrical motors operable at high speeds, many times in excess of 15,000-20,000 rpm, and in some cases up to 100,000 rpm. The limitations of magnetic components made using existing materials entail substantial and undesirable design compromises. In many applications, the core losses of the electrical steels typically used in motor components are prohibitive. In such cases a designer may be forced to use a permalloy alloy as an alternative. However, the attendant reduction in saturation induction (e.g. 0.6-0.9 T or less for various permalloy alloys versus 1.8-2.0 T for ordinary electrical steels) necessitates an increase in the size of magnetic components comprised of permalloy or variants thereof. Furthermore, the desirable soft magnetic properties of the permalloys are adversely and irreversibly affected by plastic deformation, which can occur at relatively low stress levels. Such stresses may occur either during manufacture or operation of the permalloy component.

Inductive devices are essential components of a wide variety of modern electrical and electronic equipment, most commonly including transformers and inductors. Most of these non-rotating devices employ a core comprising a soft ferromagnetic material and one or more electrical windings that encircle the core. Inductors generally employ a single winding with two terminals, and serve as filters and energy storage devices. Transformers generally have two or more windings. They transform voltages from one level to at least one other desired level, and electrically isolate different portions of an overall electric circuit. Inductive devices are available in widely varying sizes with correspondingly varying power capacities. Different types of inductive devices are optimized for operation at frequencies over a very wide range, from DC to GHz. Virtually every known type of soft magnetic material finds application in the construction of inductive devices. Selection of a particular soft magnetic material depends on the combination of properties needed, the availability of the material in a form that lends itself to efficient manufacture, and the volume and cost required to serve a given market. In general, a desirable soft ferromagnetic core material has high saturation induction $B_{sat}$ to minimize core size, along with low coercivity $H_c$, high magnetic permeability $\mu$, and low core loss to maximize efficiency.

Components of small to moderate size inductors and transformers for electrical and electronic devices are also frequently constructed using laminations punched from various grades of magnetic steel supplied in sheets having thickness as low as 100 µm. The laminations are generally stacked and secured and subsequently wound with the requisite one or more electrical windings that typically comprise high conductivity copper or aluminum wire. These laminations are commonly employed in cores with a variety of known shapes.

Many of the shapes used for inductor and transformer cores are assembled from constituent components that have the general form of certain block letters, such as "C," "U," "E," and "I", by which the components are often identified. The assembled shape may further be denoted by the letters reflecting the constituent components; for example, an "E-I" shape would be made by assembling an "E" component with an "I" component. Other widely used assembled shapes include "E-E," "C-I," and "C-C." Constituent components for prior art cores of these shapes have been constructed of both laminated sheets of conventional crystalline ferromagnetic metal and machined bulk soft ferrite blocks.

A significant trend in recent electronics technology has been the design of power supplies, converters, and related circuits using switch-mode circuit topologies. The increased capabilities of available power semiconductor switching devices have allowed switch-mode devices to operate at increasingly high frequencies. Many devices that formerly were designed with linear regulation and operation at line frequencies (generally 50-60 Hz on the power grid or 400 Hz in military applications) are now based on switch-mode regulation at frequencies that are often 5-200 kHz, and sometimes as much as 1 MHz. A principal driving force for the increase in frequency is the concomitant reduction in the size of the required magnetic components, such as transformers and inductors. However, the increase in frequency also markedly increases the magnetic losses of these components. Thus there exists a significant need to lower these losses.

The limitations of magnetic components made using existing materials entail substantial and undesirable design compromises. In many applications, the core losses of the common electrical steels are prohibitive. In such cases a designer may be forced to use a permalloy alloy or a ferrite as an alternative. However, the attendant reduction in saturation induction (e.g. 0.6-0.9 T or less for various permalloy alloys and 0.3-0.4 T for ferrites, versus 1.8-2.0 T for ordinary electrical steels) necessitates an increase in the size of the resulting magnetic components. Furthermore, the desirable soft magnetic properties of the permalloys are adversely and irreversibly affected by plastic deformation which can occur at relatively low stress levels. Such stresses may occur during either manufacture or operation of the permalloy component. While soft ferrites often have attractively low losses, their low induction values result in impractically large devices for many applications wherein space is an important consideration. Moreover, the increased size of the core undesirably necessitates a longer electrical winding, so ohmic losses increase.

For electronic applications such as saturable reactors and some chokes, amorphous metal has been employed in the form of spirally wound, round toroidal cores. Devices in this form are available commercially with diameters typically ranging from a few millimeters to a few centimeters and are commonly used in switch-mode power supplies providing up to several hundred volt-amperes (VA). This core configuration affords a completely closed magnetic circuit, with negligible demagnetizing factor. However, in order to achieve a desired energy storage capability, many inductors include a magnetic circuit with a discrete air gap. The presence of the gap results in a non-negligible demagnetizing factor and an associated shape anisotropy that are manifested in a sheared magnetization (B-H) loop. The shape anisotropy may be much higher than the possible induced magnetic anisotropy, increasing the energy storage capacity proportionately.

Toroidal cores made with discrete air gaps and conventional material have been proposed for such energy storage applications. However, the gapped toroidal geometry affords only minimal design flexibility. It is generally difficult or impossible for a device user to adjust the gap so as to select a desired degree of shearing and energy storage. In addition, the equipment needed to apply windings to a toroidal core is more complicated, expensive, and difficult to operate than comparable winding equipment for laminated cores. Oftentimes a core of toroidal geometry cannot be used in a high current application, because the heavy gage wire dictated by the rated current cannot be bent to the extent needed in the winding of a toroid. In addition, toroidal designs have only a single magnetic circuit. As a result, they are not well suited and are difficult to adapt for polyphase transformers and inductors, including especially common three-phase devices. Other configurations more amenable to easy manufacture and application are thus sought.

Moreover, the stresses inherent in a strip-wound toroidal core give rise to certain problems. The winding inherently places the outside surface of the strip in tension and the inside in compression. Additional stress is contributed by the linear tension needed to insure smooth winding. As a consequence of magnetostriction, a wound toroid typically exhibits magnetic properties that are inferior to those of the same strip measured in a flat strip configuration. Annealing in general is able to relieve only a portion of the stress, so only a part of the degradation is eliminated. In addition, gapping a wound toroid frequently causes additional problems. Any residual hoop stress in the wound structure is at least partially removed on gapping. In practice the net hoop stress is not predictable and may be either compressive or tensile. Therefore the actual gap tends to close or open in the respective cases by an unpredictable amount as required to establish a new stress equilibrium. Therefore, the final gap is generally different from the intended gap, absent corrective measures. Since the magnetic reluctance of the core is determined largely by the gap, the magnetic properties of finished cores are often difficult to reproduce on a consistent basis in the course of high-volume production.

Amorphous metals have also been used in transformers for much higher power devices, such as distribution transformers for the electric power grid that have nameplate ratings of 10 kVA to 1 MVA or more. The cores for these transformers are often formed in a step-lap wound, generally rectangular configuration. In one common construction method, the rectangular core is first formed and annealed. The core is then unlaced to allow pre-formed windings to be slipped over the long legs of the core. Following incorporation of the pre-formed windings, the layers are relaced and secured. A typical process for constructing a distribution transformer in this manner is set forth in U.S. Pat. No. 4,734,975 to Ballard et al. Such a process understandably entails significant manual labor and manipulation steps involving brittle annealed amorphous metal ribbons. These steps are especially tedious and difficult to accomplish with cores smaller than 10 kVA. Furthermore, in this configuration, the cores are not readily susceptible to controllable introduction of an air gap, which is needed for many inductor applications.

Notwithstanding the advances represented by the above disclosures, there remains a need in the art for improved amorphous metal magnetic components that exhibit a combination of excellent magnetic and physical properties needed for high speed, high efficiency rotating electric machines, as well as other non-rotating inductive devices. Construction methods are also sought that use amorphous metal efficiently and can be implemented for high volume production of motors of various types and magnetic components.

SUMMARY OF THE INVENTION

The present invention provides a low-loss bulk amorphous metal magnetic component having the shape of a polyhedron and being comprised of a plurality of layers of substantially similarly shaped amorphous metal strips that are laminated together with an adhesive agent. In one aspect of the invention, one or more such components are useful in constructing high efficiency electric motors and inductive magnetic devices.

Also provided by the present invention is a method for selectively etching amorphous metal strip feedstock to form shapes useful in constructing low core loss, bulk amorphous metal magnetic components. The term "amorphous metal strip" is used herein to denote an elongated amorphous metal ribbon material, i.e. a ribbon form having a length and width substantially greater than the thickness thereof. The length and width directions define top and bottom surfaces of the strip.

More specifically, a magnetic component constructed in accordance with one embodiment of the present invention and excited at an excitation frequency "f" to a peak induction level "$B_{max}$" will have a core loss at room temperature less than "L" wherein L is given by the formula L=0.005 $f(B_{max})^{1.5}$+0.000012 $f^{1.5}(B_{max})^{1.6}$, the core loss, the excitation frequency and the peak induction level being measured in watts per kilogram, hertz, and teslas, respectively. Preferably, the magnetic component has (i) a core-loss of less than or approximately equal to 2.8 watt-per-kilogram of amorphous metal material when operated at a frequency of approximately 400 Hz and at a flux density of approximately 1.3 Tesla (T); (ii) a core-loss of less than or approximately equal to 5.7 watts-per-kilogram of amorphous metal material when operated at a frequency of approximately 800 Hz and at a flux density of approximately 1.3 T, or (iii) a core-loss of less than or approximately equal to 9.5 watt-per-kilogram of amorphous metal material when operated at a frequency of approximately 2,000 Hz and at a flux density of approximately 1.0 T.

As a result of its very low core losses under periodic magnetic excitation, the magnetic component of the invention is operable at frequencies ranging from DC to as much as 20,000 Hz or more. It exhibits improved performance characteristics when compared to conventional silicon-steel magnetic components operated over the same frequency range. For example, the component's operability at high frequency allows it to be used in fabricating motors that advantageously are operable at higher speeds and with higher efficiencies than are possible using components made with conventional materials.

In particular, bulk amorphous metal magnetic components constructed in accordance with the present invention are especially suited for use as amorphous metal stators or stator components in highly efficient, variable reluctance motors and eddy current motors. Similarly, bulk amorphous metal components may be used as at least one of the rotor and the stator in squirrel cage motors, reluctance synchronous motors and switched reluctance motors. It will be understood by those skilled in the art that such motors may comprise one or more rotors and one or more stators. Accordingly, the terms "a rotor" and "a stator" as used herein with reference to motors mean a number of rotors and stators ranging from 1 to as many as three or more. It will further be recognized by those familiar with the rotating electrical machine art that radial flux motors may be constructed either: with (i) the rotor located within, and having a generally smaller diameter than, the stator or (ii) in the inside-out or cup configuration in which the relative positions and sizes of the rotor and stator are exchanged. A rotor or a stator of the invention may be constructed either as a unitary structure or as an assembly of a plurality of sub-structures held together by known means, the sub-structures being made as taught herein.

It will also be recognized by those skilled in the art that the term "electric motor," as used herein, refers generically to a variety of rotating dynamoelectric machines which additionally comprise electric generators as well as regenerative motors that may be operated optionally as electric generators. The magnetic component of the invention may be employed in constructing any of these devices. Significant advantages are realized during use of the present invention. These advantages include simplified manufacturing and reduced manufacturing time, reduced stresses (i.e., magnetostrictive) encountered during construction of bulk amorphous metal components, optimized performance of the finished amorphous metal magnetic component, and improved efficiency of an electric motor comprising the rotor or stator disclosed herein.

One or more of the present bulk magnetic components are also advantageously incorporated in an inductive device, which comprises: (i) a magnetic core having a magnetic circuit with at least one air gap and including at least one low-loss bulk ferromagnetic amorphous metal magnetic component; (ii) at least one electrical winding encircling at least a portion of the magnetic core; and (iii) the component comprising a plurality of substantially similarly shaped, planar layers of amorphous metal strips stacked, registered, and bonded together with an adhesive agent to form a polyhedrally shaped part. The inductive device has a core-loss less than about 12 W/kg when operated at an excitation frequency "f" of 5 kHz to a peak induction level "$B_{max}$" of 0.3 T. It finds use in a variety of circuit applications, for example serving as a transformer, autotransformer, saturable reactor, or inductor. The component is especially useful in the construction of power conditioning electronic devices that employ various switch mode circuit topologies. The present device is useful in both single and polyphase applications, and especially in three-phase applications.

Advantageously the bulk amorphous metal magnetic components are readily assembled to form the one or more magnetic circuits of the finished inductive device. In some aspects, the mating faces of the components are brought into intimate contact to produce a device having low reluctance and a relatively square B-H loop. However, by assembling the device with air gaps interposed between the mating faces, the reluctance is increased, providing a device with enhanced energy storage capacity useful in many inductor applications. The air gaps are optionally filled with non-magnetic spacers.

The flexibility of size and shape of the components of the invention permits a designer wide latitude in suitably optimizing an inductive component, including choice of the size and configuration of both the overall core and the one or more winding windows therein. Selective etching is especially beneficial in the preparation of components of any desired size and shape. As a result, the overall size of the device is readily minimized, along with the volume of both core and winding materials required. The combination of flexible device design and the high saturation induction of the core material is beneficial in designing electronic circuit devices having compact size and high efficiency. Compared to conventional inductive devices using lower saturation induction core material, transformers and inductors of given power and energy storage ratings generally are smaller and more efficient. As a result of its very low core losses under periodic magnetic excitation, the inductive device of the invention is operable at frequencies ranging from DC to as much as 200 kHz or more. It exhibits improved performance characteristics when compared to conventional silicon-steel magnetic devices operated over the same frequency range. These and other desirable attributes render the present device easily customized for specialized magnetic applications, e.g. for use as a transformer or inductor in power conditioning electronic circuitry employing switch-mode circuit topologies and switching frequencies ranging from 1 kHz to 200 kHz or more.

The present invention further provides a method of constructing a bulk amorphous metal magnetic component. An implementation of the method includes the steps of: (i) selectively etching amorphous metal strip material to form a plurality of laminations, each having a substantially identical pre-determined shape; (ii) stacking the laminations in registry to form a lamination stack; and (iii) adhesively bonding the lamination stack with an adhesive agent. The method may further comprise an optional heat treatment or annealing to improve the magnetic properties of the component or an optional coating step wherein an insulating coating is applied to at least a portion of the surface of the component. These steps may be carried out in a variety of orders and using a variety of techniques including those set forth hereinbelow. For example, the adhesive bonding step may be carried out before or after the annealing step. The preferred amorphous metal material preferably used in the practice of the method has a composition consisting essentially of the formula $Fe_{80}B_{11}Si_9$.

Optionally, the process also comprises the step of finishing the component to accomplish at least one of: (i) removing excess adhesive from the component; (ii) giving the component a suitable surface finish; and (iii) removing material to give the component its final component dimensions. The process may also comprise annealing the laminations to improve the magnetic properties of the component.

Advantageously, compressive and tensile stresses that result inherently from bending strip during winding are absent in a fabrication method that employs individually formed laminations. Any stress resulting from the formation of the laminations will likely be confined merely to a small region at or near the periphery thereof. Optionally the lamination stack is then finished to remove any excess adhesive and to give it a suitable surface finish and final component dimensions.

The formation of laminations in the requisite shape for the present component may be carried out in a number of ways, including non-exclusively cutting by mechanical grinding, diamond wire, high-speed milling performed in either horizontal or vertical orientation, abrasive water jet milling, electric discharge machining by wire or plunge, electrochemical grinding, electrochemical machining, stamping, laser cutting, or other means known to one having ordinary skill in the relevant art.

The present bulk magnetic component preferably incorporates laminations cut by a selective etching process. Generally stated, the process comprises the steps of: (i) providing an amorphous metal sheet having a first surface and a second surface; (ii) printing chemically resistive material onto said first surface in a pattern defining said preselected shape; (iii) covering said second surface with a protective layer; (iv) exposing said amorphous metal sheet to a corrosive agent to selectively etch amorphous metal from areas of said first surface outside said preselected shape; and (v) separating said shape from said amorphous metal sheet. Although the present selective etching process is preferably used to cut individual layers of amorphous metal pieces for assembly into bulk amorphous metal magnetic components, the process may also be used to prepare shapes for other applications, such as brazing filler metal preforms.

The present selective etching process advantageously permits the size and shape of laminations to be selected or changed much more easily than stamping processes that require expensive redesign or rework of precision die sets. In addition, intricate shapes are easily accommodated.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DETAILED DESCRIPTION OF THE INVENTION

The present invention is directed, in one aspect, to a process for cutting workpieces from amorphous metal ribbon or sheet and to low-loss bulk amorphous metal components incorporating such workpieces. The components, in turn, are useful in constructing a wide variety of devices including high efficiency inductive devices and dynamoelectric motors.

Generally polyhedrally shaped bulk amorphous metal components constructed in accordance with the present invention have various geometries including, but not limited to, rectangular and square prisms. In addition, any of the previously mentioned geometric shapes may include at least one arcuate surface, and preferably two oppositely disposed arcuate surfaces to form a generally curved or arcuate bulk amorphous metal component. The invention also provides components wherein the polyhedral shape is generally cylindrical and may further comprise a plurality of teeth extending radially inward or outward from a generally annular portion. Complete stators and rotors for certain types of electric motors advantageously employ such toothed bulk amorphous metal components in accordance with the present invention. Those stators and rotors may have either a unitary construction or they may be formed from a plurality of pieces, which collectively form the completed component. Alternatively, a stator and/or rotor may be a composite structure comprised entirely of amorphous metal parts or a combination of amorphous metal parts with other magnetic materials. The bulk magnetic component of the invention may be incorporated in an electric motor, preferably of the radial flux variety.

The invention further provides an inductive device incorporating one or more bulk magnetic components assembled with layers of amorphous metal cut in accordance with the present method. The inductive device has at least one air gap, but may also involve more complicated shapes with plural air gaps and plural magnetic circuits wherein the reluctance of the circuits is adjustable by varying the air gap in the core configuration chosen.

Figure 1A:
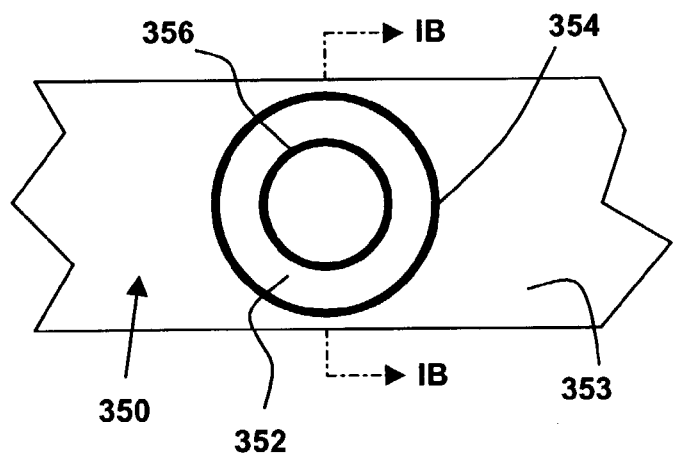
FIG. 1A is a plan view of a layer of amorphous metal feedstock that has been selectively etched to define an annular piece of amorphous metal used in constructing a bulk amorphous metal magnetic component in accordance with the invention.
Figure 1B:
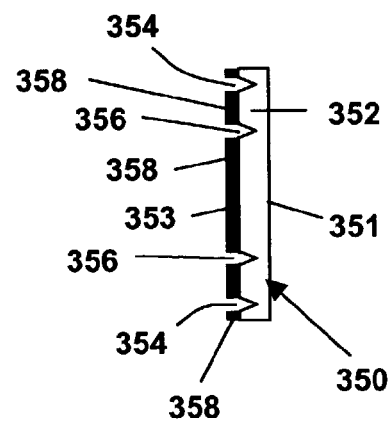
FIG. 1B is a cross-section view taken at level IB-IB of the layer of amorphous metal feedstock depicted in FIG. 1A that has been selectively etched to define an annular piece of amorphous metal used in constructing a bulk amorphous metal magnetic component in accordance with the invention.

Referring now to FIGS. 1A-1B of the drawings, there is shown one implementation of the selective etching process of the invention for producing cut shapes of amorphous metal material. Amorphous metal feedstock in the form of an extended ribbon 350 has a free side 351. Chemically resistive material 358 is applied to the opposite side 353 of the ribbon in a pattern that defines an annulus 352. Resistive material 358 is applied generally to surface 353 except for narrow concentric outer circular boundary region 354 and inner circular boundary region 356. The free side 351 is covered by a protective layer and the ribbon is then exposed to a corrosive agent for a requisite time. In one embodiment the protective layer is composed of the same chemically resistive material used to define the shapes on side 353. Alternatively, the free side 351 is mated to a carrier layer (not shown) composed of a material that is not significantly attacked by the corrosive agent. The carrier strip preferably is composed of a corrosion-resistant metal such as stainless steel, nickel-base alloy such as inconel, titanium, tantalum, or aluminum, or a polymeric material. Preferably an adhesive agent is used to weakly adhere the carrier strip to the amorphous metal strip. The carrier strip may also be adhered by magnetic or electrostatic forces. In some implementations the carrier strip is used to transport the ribbon in a semi-continuous or continuous reel-to-reel process through apparatus for accomplishing at least some of the required fabrication steps. Advantageously the carrier strip is reused in some implementations. The protective layer substantially protects free side 351 from attack, but amorphous metal on side 353 unprotected by material 358 is chemically eroded, creating grooves at regions 354 and 356 that optionally do not fully penetrate the thickness of ribbon 350. The grooves weaken the ribbon to allow annulus 352 to be readily separated from the remainder of the web of ribbon 350. In some embodiments, a longer exposure to the corrosive agent fully erodes the grooves, completely separating annulus 352. Too short an exposure does not sufficiently weaken the ribbon to allow the separation with a reasonable force.

Figure 2A:
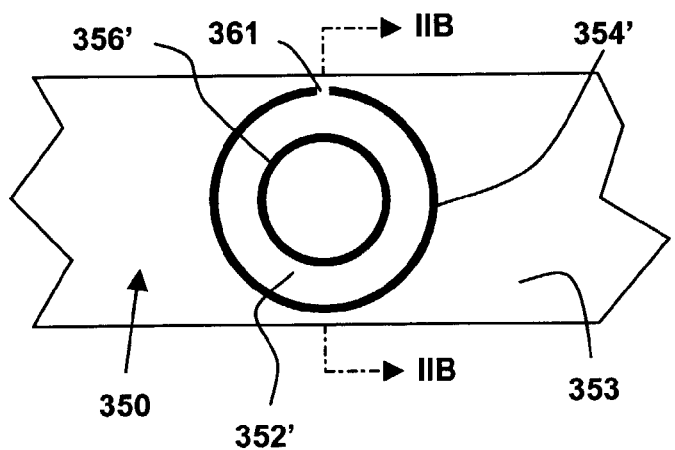
FIG. 2A is a plan view of a layer of amorphous metal feedstock that has been selectively etched to define an annular piece of amorphous metal used in constructing a bulk amorphous metal magnetic component in accordance with the invention.
Figure 2B:
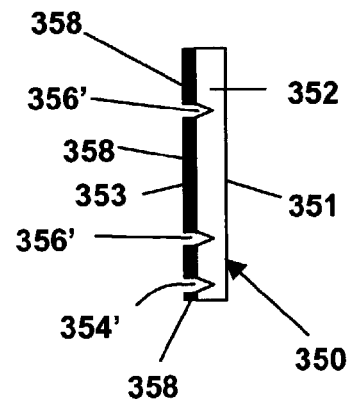
FIG. 2B is a cross-section view taken at level IIB-IIB of the layer of amorphous metal feedstock depicted in FIG. 2A that has been selectively etched to define an annular piece of amorphous metal used in constructing a bulk amorphous metal magnetic component in accordance with the invention.

A related implementation of the selective etching process of the invention is depicted in FIGS. 2A-2B. In this implementation outer boundary region 354' is a circular arc subtending slightly less than a full 360°. The chemically resistant material 358 covers the remainder of the circle. As a result, the etching process leaves a small tab 361 by which annulus 352' remains attached to the ribbon web after etching, whether or not the time of exposure of ribbon 350 to the etchant is sufficient to fully erode and penetrate grooves in regions 354' and 356' through the ribbon thickness. In other embodiments a plurality of such tabs may be provided around the periphery of a workpiece.

Preferably, the methods depicted in FIGS. 1-2 are carried out repeatedly to form a series of parts, such as annuli 352, disposed at regular intervals along a length of amorphous metal strip feedstock. After selective etching, the parts remain attached to the feedstock and can be further processed. More preferably, the feedstock is wound after etching onto a spool bearing an extended length of ribbon with a large number of etched parts attached thereto. Optionally the carrier layer is left attached to the ribbon, but the carrier also may be removed after the etching operation but before the material is re-spooled. Furthermore, processes such as those of FIGS. 1-2 may readily be implemented in a semi-continuous or continuous, reel-to-reel process. While the part depicted in the embodiment of FIGS. 1-2 is chosen for illustrative purposes to have the relatively simple shape of an annulus, the present process is readily adapted to fabricate much more complicated shapes. Advantageously, the process may be used to form shapes with multiple features such as multi-toothed motor laminations without entailing the expense of preparing and maintaining intricate die-punch sets needed for conventional stamping. As a result, the present process is especially suited for rapid prototyping or efficient, high-volume production of such parts.

A number of processes are suitable for applying the chemically resistant material to a part of one of the ribbon surfaces to define the preselected shape of the present workpieces in preparation for the etching operation. Preferably, some areas of the feedstock surface corresponding to the desired shape are coated with the protective material, while those areas outside the desired shape are left uncoated. The chemically resistant material protects coated areas from attack by the etchant, while unprotected areas are eroded.

Printing processes are preferred for applying the chemically resistant material. By printing is meant any process for rapidly applying multiple reproductions of a preselected pattern of the resistant material to a surface of the feedstock material. Many known printing processes are suitable for the practice of the present invention, including lithographic, relief, gravure, and screen printing methods. In addition, xerographic and ink-jet deposition methods are suitable. In many of these processes the deposition can be done with a continuously fed feedstock, eliminating the need for indexed motion wherein sections of feedstock are sequentially brought into position and stopped for depositing the resist material over an area. The needed indexing operation entails starting and stopping the material, complicating automation of the process and leading to frequent misfeeds, breakouts, and other misfortunes that require manual operator intervention. Conventional two-sided photoetching processes for metallic strip material also generally require such an indexing procedure.

The aforementioned single-sided, selective etching processes offer significant advantages over previous photolithographic etching methods suitable for metallic strip material. The latter methods generally require a pattern to be formed in registry on both sides of the feedstock, especially for producing parts for which dimensional requirements are less stringent, e.g. control to within about 1 µm contingent on sufficiently accurate registration of the photolithographic masks on the two sides of the strip. However, many parts used in magnetic components do not require such tight dimensional control, with tolerances as high as 10 µm being acceptable. As a result, the deposition of a single-sided, shaped protective layer and the remainder of the forming process can be carried out more efficiently and rapidly, without the need for accurately registering etching patterns on opposite sides of ribbon feedstock, and thereby reducing the complexity and cost of producing the individual parts.

The individual parts of the invention are selectively etched by exposing one side of the feedstock bearing patterned resistive agent to a corrosive agent, which can be gaseous but is preferably a liquid such as a strong acid, for a time sufficient to achieve the desired etching depth. In some embodiments, the exposure is continued for a time sufficient for the etching to remove material in the boundary region between the workpieces and the remaining web to the full depth of the feedstock, so that the desired part is severed from the remainder of the feedstock web. In other embodiments, the exposure is of a lesser duration, so that the etchant does not penetrate to the full depth but leaves a weakened portion defining the boundary between the desired part and the remaining web. Optionally the chemically resistant material is removed from the ribbon surface after the etching step is completed. A variety of techniques may be used, including dissolving the material in a suitable solvent, decomposition, or mechanical scraping, abrasion, or the like.

Advantageously, the embodiments of the process depicted by FIGS. 1-2 facilitate the subsequent handling and incorporation of selectively etched parts in bulk magnetic components. Preferably, the boundary between the workpieces of interest and the remaining web of amorphous metal ribbon feedstock is weakened sufficiently by the etching operation to allow the workpieces to be readily separated at a desired stage of the production process. As discussed hereinabove, the etching may entail removal of a substantial portion of the thickness in the boundary region, preferably at least about 50% and more preferably at least about 80%. Alternatively, some portions of the peripheral boundary layer may be substantially completely penetrated, while others are not, whereby the workpieces remain attached to the ribbon web by a small number of tabs, e.g. as few as the one tab shown in FIGS. 2A-2B. In any of these approaches, a mechanical operation, e.g. a manual separation or a simple manual or automated stamping operation may subsequently be used to remove and collect a requisite number of workpieces for assembly into a bulk component. Such a stamping operation is far easier and less demanding than conventional stamping techniques which must accurately sever the workpieces without any predefined weakened regions. Automated, in-line processes that include in sequence the supply of ribbon feedstock from a supply reel, the aforementioned selective etching of the workpieces and web, a stamping step to separate the workpieces and accumulate individual workpieces, and collection of the remaining web on a take-up reel, are preferred since they afford efficient, cost effective manufacture.

Figure 3:
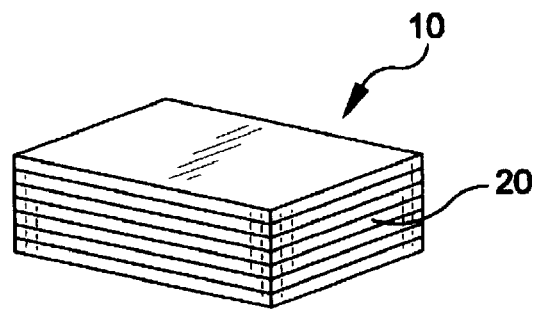
FIG. 3 is a perspective view of a bulk amorphous metal magnetic component in the shape of a three-dimensional rectangle constructed in accordance with the present invention.

The foregoing process is advantageously used to fabricate amorphous metal lamination layers for incorporation in a generally polyhedrally shaped bulk amorphous metal motor component. As used herein, the term polyhedron refers to a multi-faced or sided solid. This includes, but is not limited to, three-dimensional rectangles, squares, trapezoids, and prisms. In addition, any of the previously mentioned geometric shapes may include at least one, and preferably two, arcuate surfaces or sides that are disposed opposite each other to form a generally arcuately shaped component. The component of the invention may also have a generally cylindrical shape. The magnetic component 10 depicted by FIG. 3 is comprised of a plurality of substantially similarly shaped layers of amorphous metal strip material 20 that are laminated together and annealed. A three-dimensional magnetic component 10 constructed in accordance with the present invention and excited at an excitation frequency "f" to a peak induction level "$B_{max}$" has a core loss at room temperature less than about "L" wherein L is given by the formula $L=0.005\, f(B_{max})^{1.5}+0.000012\, f^{1.5}(B_{max})^{1.6}$, the core loss, the excitation frequency and the peak induction level being measured in watts per kilogram, hertz, and teslas, respectively. In certain preferred embodiments, the magnetic component has (i) a core-loss of less than or approximately equal to 2.8 watt-per-kilogram of amorphous metal material when operated at a frequency of approximately 400 Hz and at a flux density of approximately 1.3 Tesla (T); (ii) a core-loss of less than or approximately equal to 5.7 watts-per-kilogram of amorphous metal material when operated at a frequency of approximately 800 Hz and at a flux density of approximately 1.3 T, or (iii) a core-loss of less than or approximately equal to 9.5 watt-per-kilogram of amorphous metal material when operated at a frequency of approximately 2,000 Hz and at a flux density of approximately 1.0 T.

The component of the invention advantageously exhibits low core loss when the component or any portion thereof is magnetically excited along any direction substantially within the plane of the amorphous metal pieces comprised therein. The reduced core loss of the component of the invention in turn improves the efficiency of a motor or inductive device comprising it. The low values of core loss make the bulk magnetic component of the invention especially suited for use in motors wherein a high pole count or a high rotational speed necessitates a high frequency magnetic excitation, e.g., excitation at above 100 Hz. The inherent high core loss of conventional steels at high frequency generally renders them unsuitable for use in motors requiring high frequency excitation. These core loss performance values apply to the various embodiments of the present invention, regardless of the specific geometry of the bulk amorphous metal component.

Figure 4A:
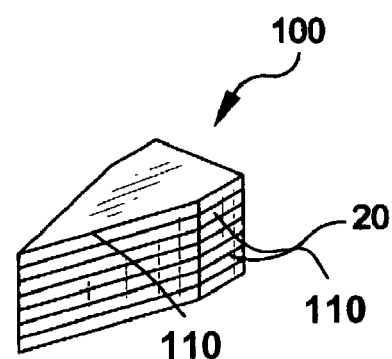
FIG. 4A is a perspective view of a bulk amorphous metal magnetic component having the shape of a prism and constructed in accordance with the present invention.

The magnetic component 100 depicted by FIG. 4A is generally prism-shaped and preferably includes five (5) sides 110 or surfaces. The pentagonally-shaped 20 polyhedron component 100 is comprised of a plurality of layers of amorphous metal strip material 20 that are each substantially the same size and shape. The strip material 20 is stacked, laminated together and then annealed.

Figure 4B:
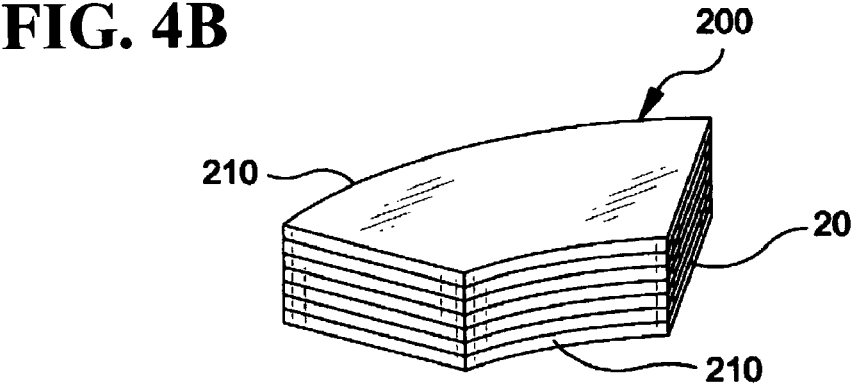
FIG. 4B is a perspective view of a bulk amorphous metal magnetic component having oppositely disposed arcuate surfaces and constructed in accordance with the present invention.

The magnetic component 200 depicted by FIG. 4B includes at least one, and preferably two oppositely disposed arcuate surfaces 210. The arcuately shaped component 200 is comprised of a plurality of layers of amorphous metal strip material 20 that are each substantially the same size and shape and that are stacked, laminated together, and annealed.

Figure 4C:
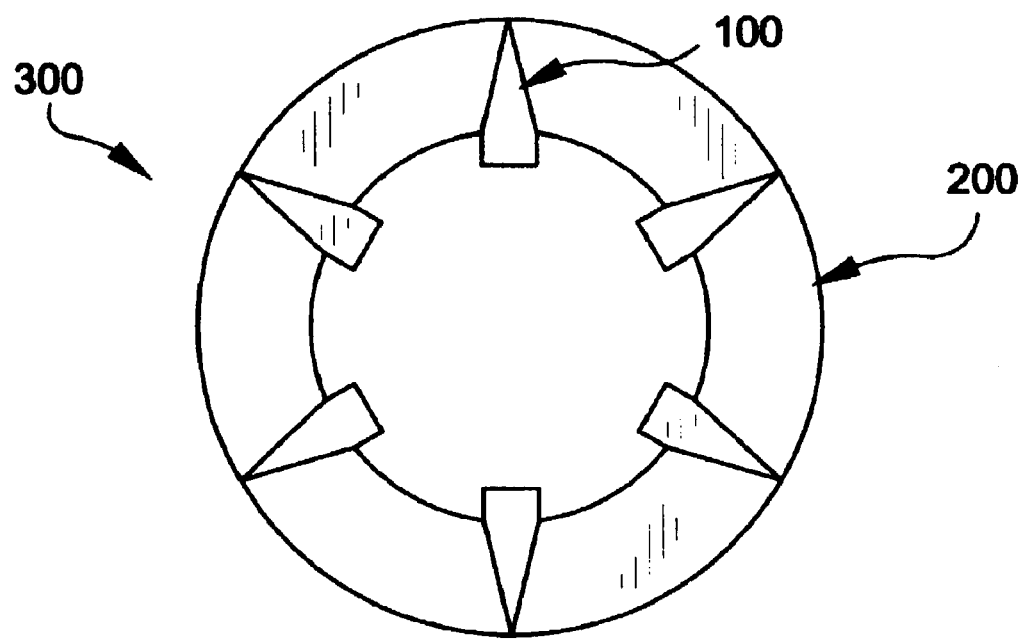
FIG. 4C is a top view of a stator for an electric motor constructed from six prism-shaped components as depicted in FIG. 4A and six arcuate components as depicted in FIG. 4B.

The bulk amorphous metal magnetic component 300 depicted by FIG. 4C may be used as a stator for a radial gap electric motor and is comprised of six pieces of magnetic component 100 and six pieces of magnetic component 200.

Figure 5A:
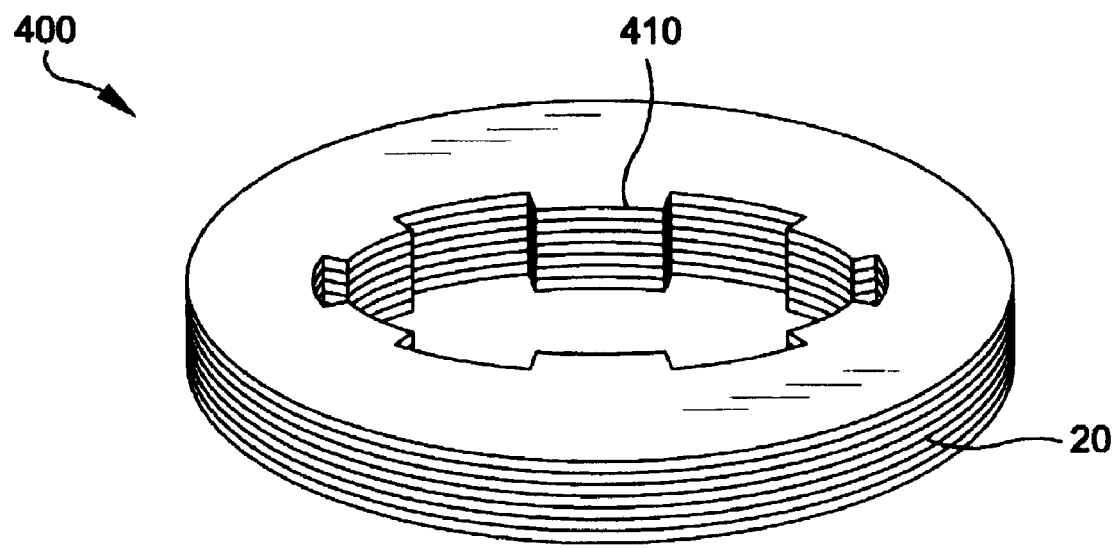
FIG. 5A is a perspective view of a bulk amorphous metal magnetic stator for an electric motor constructed in accordance with the present invention.

The bulk amorphous metal magnetic component 400 depicted by FIG. 5A is generally circular and includes a plurality of generally rectangular teeth 410 that extend radially inward toward the center of the circular component

400. The component 400 is comprised of a plurality of layers of amorphous metal strip material 20 that are each substantially the same size and shape and that are stacked, laminated together, and then annealed. A bulk amorphous metal component constructed in accordance with the embodiment of FIG. 5A may be used as a stator in a radial air gap electric motor.

Figure 5B:
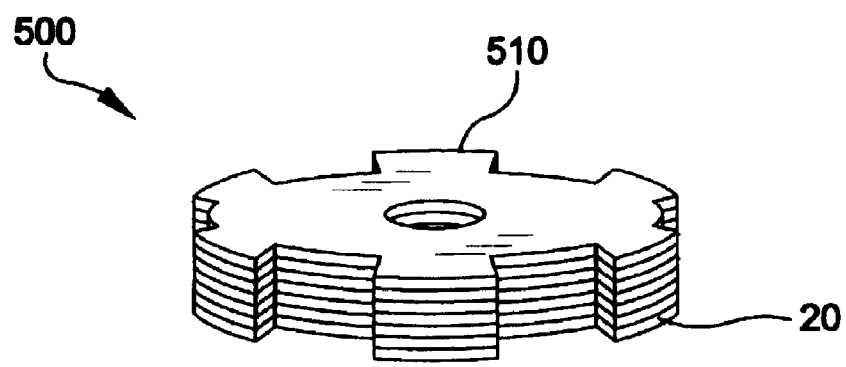
FIG. 5B is a perspective view of a bulk amorphous metal magnetic rotor for an electric motor constructed in accordance with the present invention.

The bulk amorphous metal component 500 depicted in FIG. 5B is generally disc-shaped and includes a plurality of generally rectangular teeth 510 that extend radially outward. The component 500 is comprised of a plurality of layers of amorphous metal strip material 20 that are each substantially the same size and shape and that are stacked, laminated together, and annealed. A bulk amorphous metal component constructed in accordance with the embodiment of FIG. 5B may be used as a rotor in a radial air gap electric motor.

Figure 5C:
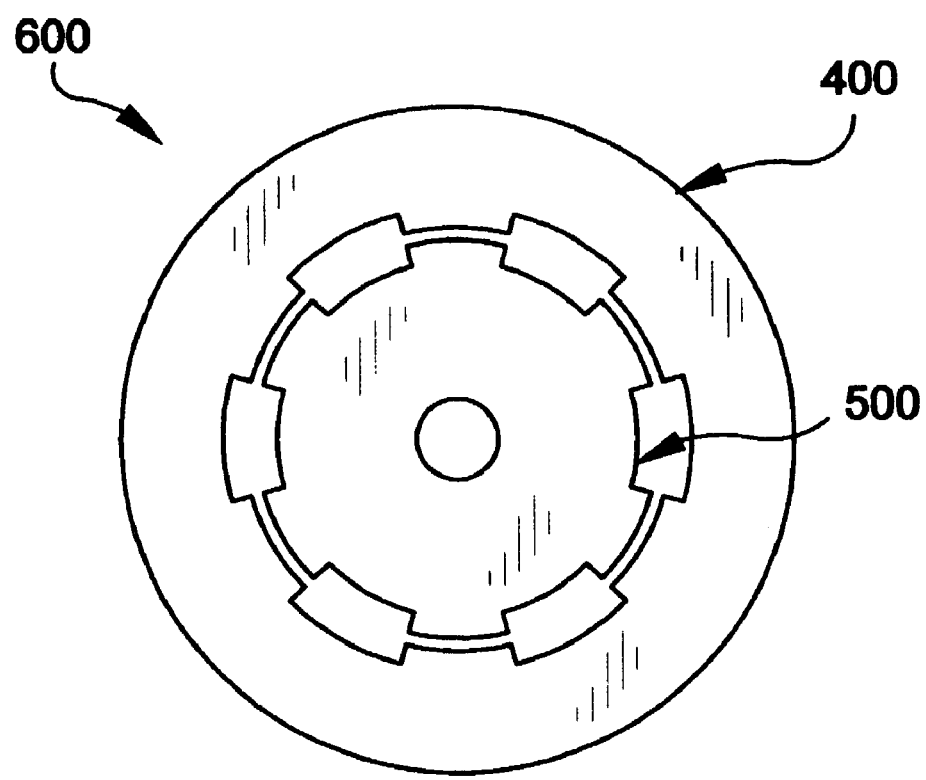
FIG. 5C is a top view of the stator and rotor for an electric motor constructed from the stator of FIG. 5A and the rotor of FIG. 5B.

Referring next to FIG. 5C, a stator 400 and rotor 500 are constructed as bulk amorphous metal components in accordance with the present invention and used as part of a high efficiency radial air gap electric motor 600. The motor further comprises windings and bearings that rotatably support rotor 500 in alignment with stator 400, as will be recognized by one skilled in the motor art.

Figure 5D:
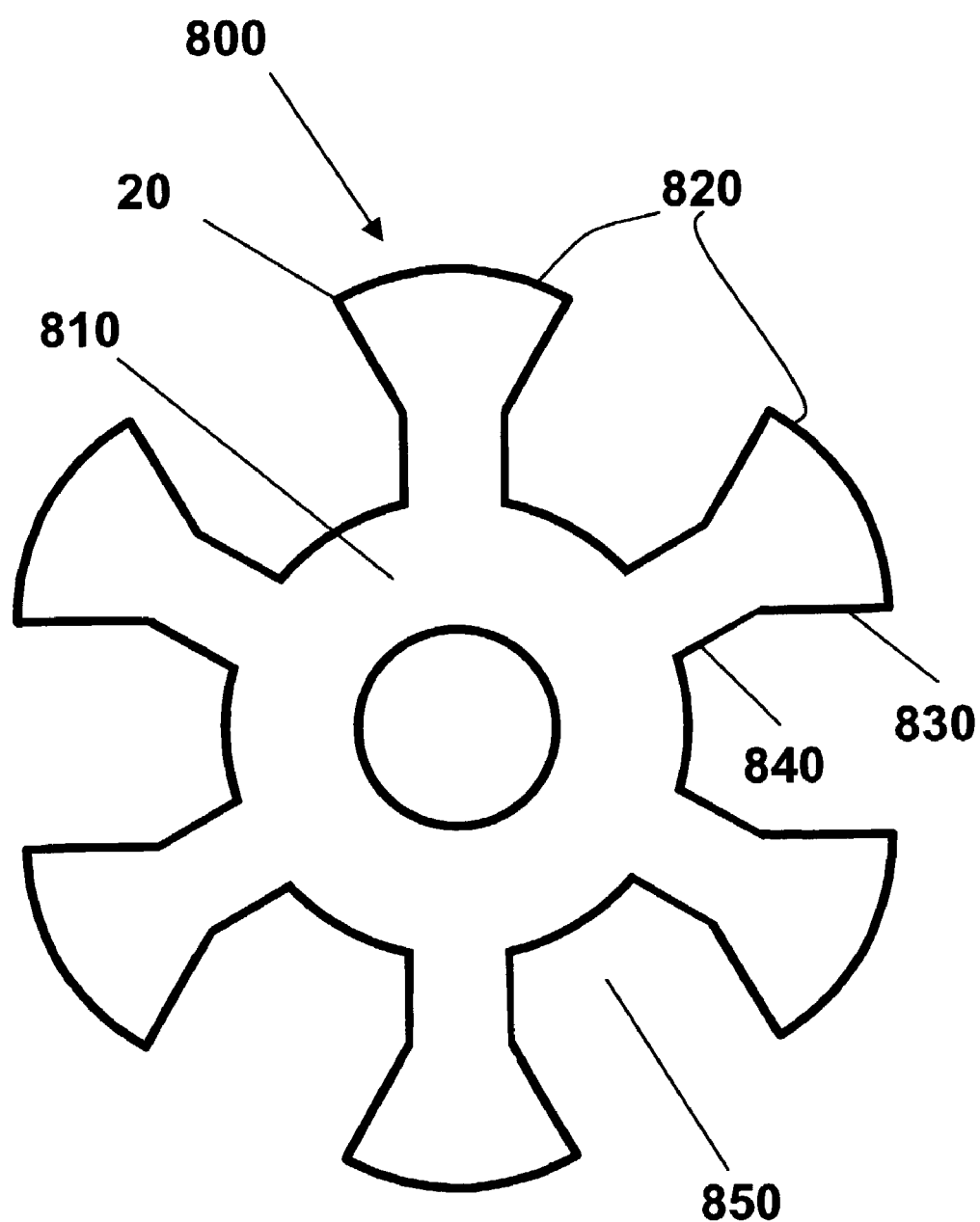
FIG. 5D is a top view of a bulk amorphous metal magnetic stator for an inside-out, radial gap electric motor constructed in accordance with the present invention.

The bulk amorphous component 800 depicted by FIG. 5D may be used as a stator in a high efficiency, inside-out, radial air gap electric motor. Component 800 comprises a plurality of laminations 20 substantially identical in shape. Each lamination 20 includes a central portion 810 having a generally annular size and shape, and a plurality of tooth portions 820 which extend radially outward from the central portion 810. The tooth portions 820 are often called, simply, teeth. Laminations 20 are cut in the requisite shape by any suitable process, selective etching methods being preferable. The cut laminations are then stacked in registry and bonded together by adhesive impregnation to form component 800. The impregnation serves to disperse and infiltrate adhesive agent between the laminations, whereby at least a portion of the surface of each lamination is covered by the agent. In operation of component 800 as a stator in an electric motor, central portion 810 functions as back iron, that is, a flux return path, for magnetic flux lines that enter and exit the stator through teeth 820. Each of teeth 820 may have a widened portion 830 toward its extremity at the outside, peripheral circumference of component 800. The portion 840 of each tooth 820 proximate to central portion 810 is often called the tooth root. A winding slot 850 is formed by the gap between each adjacent pair of teeth 820. When component 800 is configured as a stator used in a motor, electrical windings (not depicted) encircle each tooth 820, passing through winding slots 850 aside that tooth. During motor operation, the windings are energized by a flow of electric current to provide magnetomotive force. The windings of the individual teeth may be interconnected and electrically energized in a variety of ways known in the motor art.

The present invention further provides a method for constructing the low loss bulk component. In one aspect, individual laminations of the requisite shape are prepared from amorphous metal strips and subsequently stacked to form a three-dimensional lamination stack and bonded. Laminations may be cut by any suitable method, but selective etching is preferred. The bonding preferably comprises applying and activating adhesive means to adhere the laminations to each other and thereby give the lamination stack sufficient mechanical and structural integrity for the component to be handled and operated in a finished device. Optionally the component is finished to accomplish at least one of: (i) removing excess adhesive; (ii) giving the component a suitable surface finish; and (iii) removing material whereby the stack is given its final component dimensions. The method further comprises an optional annealing step to improve the magnetic properties of the component. The steps of the method may be carried out in a variety of orders and using a variety of techniques, including those set forth herein and others, which will be obvious to those skilled in the art.

Methods of forming laminations that do not produce burrs or other edge defects are especially preferred. More specifically, these and other defects that protrude from the plane of the lamination are formed in some processes and under certain conditions. The defects frequently produce interlaminar electrical shorting which, in turn, deleteriously increases the component's iron loss.

Advantageously, selective etching of a part generally is found to greatly minimize or eliminate the incidence of such edge defects. Typically, selectively etched parts exhibit rounded edges and tapering of the part's thickness in the immediate vicinity of the edges, thereby reducing the likelihood of the aforementioned interlaminar shorting in a lamination stack of such parts. In addition, the impregnation of such a stack with an adhesive agent is facilitated by the enhancement of wicking and capillary action in the vicinity of the tapered edges. Providing of one or more small holes through each lamination may further improve the efficacy of impregnation. When the individual laminations are stacked in registry, the holes may be aligned to create a channel through which an impregnant may readily flow, thereby assuring better distribution of the impregnant over at least a substantial area of the surface at which each lamination is mated with the adjacent laminations. Other structures, such as surface channels and slots may also be incorporated into each lamination that also may serve as impregnant flow enhancement means. The aforementioned holes and flow enhancement means are readily and effectively produced in photoetched laminations. In addition, various spacers may be interposed in the lamination stack to promote flow enhancement.

Embodiments that employ a stamping operation or the like to remove individual workpieces from a ribbon web in many cases benefit from an optional mild heat treatment of the strip material prior to stamping beneficially alters the mechanical properties of the amorphous metal. Specifically, heat treatment will somewhat reduce the ductility of the amorphous metal, thereby limiting the amount of mechanical deformation in the amorphous metal prior to fracture during the stamping process, and thus the required mechanical die force. Reduced ductility of the amorphous metal will also reduce the direct abrasion and wear of the punch and die materials by the deforming amorphous metal.

Adhesive means are used in the practice of this invention to adhere a plurality of pieces or laminations of amorphous metal strip material in suitable registry to each other, thereby providing a bulk, three-dimensional object. This bonding affords sufficient structural integrity that permits the present component to be handled and used, or incorporated into a larger structure. A variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, high operating temperature capability, and high dielectric strength. The adhesive may cover any fraction of the surface area of each lamination sufficient to effect adequate bonding of adjacent laminations to each other and thereby impart sufficient strength to give the finished component mechanical integrity. The adhesive may cover up to substantially all the surface area. Epoxies may be either multi-part whose curing is chemically activated or single-part whose curing is activated thermally or by exposure to ultra-violet radiation. Preferably, the adhesive has a viscosity of less than 1000 cps and a thermal expansion coefficient approximately equal to that of the metal, or about 10 ppm. One preferred adhesive is a thermally activated epoxy sold under the trade name Epoxylite 8899 by the P. D. George Co. The device of the invention is preferably bonded by impregnation with this epoxy, diluted 1:5 by volume with acetone to reduce its viscosity and enhance its penetration between the layers of the ribbon. Another adhesive found to be preferable is a methyl cyanoacrylate sold under the trade name Permabond 910FS by the National Starch and Chemical Company. The device of the invention is preferably bonded by applying this adhesive such that it will penetrate between the layers of the ribbon by capillary action. Permabond 910FS is a single part, low viscosity liquid that will cure at room temperature in the presence of moisture in 5 seconds.

Suitable methods for applying the adhesive include dipping, spraying, brushing, and electrostatic deposition. In strip or ribbon form amorphous metal may also be coated by passing it over rods or rollers which transfer adhesive to the amorphous metal. Rollers or rods having a textured surface, such as gravure or wire-wrapped rollers, are especially effective in transferring a uniform coating of adhesive onto the amorphous metal. The adhesive may be applied to an individual layer of amorphous metal at a time, either to strip material before or after the cutting or to individual laminations after cutting. Alternatively, the adhesive means may be applied to the laminations collectively after they are stacked. Preferably, the stack is impregnated by capillary flow of the adhesive between the laminations. The impregnation step may be carried out at ambient temperature and pressure. Alternatively but preferably, the stack may be placed either in vacuum or under hydrostatic pressure to effect more complete filling, yet minimizing the total volume of adhesive added, thus assuring high stacking factor. A low-viscosity adhesive agent, such as an epoxy or cyanoacrylate is preferably used. Mild heat may also be used to decrease the viscosity of the adhesive, thereby enhancing its penetration between the lamination layers. The adhesive is activated as needed to promote its bonding. After the adhesive has received any needed activation and curing, the component may be finished to remove any excess adhesive and to give it a suitable surface finish and the final required component dimensions. If carried out at a temperature of at least about 175° C., the activation or curing of the adhesive may also serve to affect magnetic properties as discussed in greater detail hereinbelow.

The finishing of the component of the invention may further comprise application of an external coating to at least a portion of its external surface. Suitable coatings include paint, lacquer, varnish, or resins. The coating may be applied by various methods, including spraying and immersion in a bath or fluidized bed. Simple spraying techniques either with or without a solvent carrier may be used. Alternatively, electrostatic or electrophoretic deposition techniques are suitable. If required, the finishing operation may also include removal of any excess coating. Such a process is especially beneficial for motor components wherein excess material may be present in regions of close clearance between mutually rotating parts. An external coating beneficially protects the insulation of electrical windings on components from abrasion at sharp metal edges and acts to trap any flakes or other material which might tend to come off the component and be attracted to a permanent magnet or otherwise become lodged inappropriately in the motor or other nearby structure.

Construction in the manner disclosed herein is highly suited for magnetic components such as electric motors stators and rotors and non-rotating inductive devices. Magnetic component manufacturing is simplified and manufacturing time is reduced. Stresses otherwise encountered during the construction of bulk amorphous metal components are minimized. Magnetic performance of the finished components is optimized. The various process steps described herein may be carried out in the sequence listed, or in other orders that will be apparent to one skilled in the relevant art.

The bulk amorphous metal magnetic component of the present invention can be manufactured using numerous amorphous metal alloys. Generally stated, the alloys suitable for use in constructing the component of the present invention are defined by the formula: $M_{70-85}Y_{5-20}Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta and W, and (ii) up to ten (10) atom percent of components (Y+Z) can be replaced by at least one of the non-metallic species In, Sn, Sb and Pb. As used herein, the term "amorphous metallic alloy" means a metallic alloy that substantially lacks any long-range order and is characterized by X-ray diffraction intensity maxima which are qualitatively similar to those observed for liquids or inorganic oxide glasses.

Amorphous metal alloys suitable as feedstock in the practice of the invention are commercially available, generally in the form of continuous thin strip or ribbon in widths up to 20 cm or more and in thicknesses of approximately 20-25 µm. These alloys are formed with a substantially fully glassy microstructure (e.g., at least about 80% by volume of material having a non-crystalline structure). Preferably the alloys are formed with essentially 100% of the material having a non-crystalline structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M," "Y," and "Z" are at least predominantly iron, boron, and silicon, respectively. Accordingly, it is preferred that the alloy contain at least 70 atom percent Fe, at least 5 atom percent B, and at least 5 atom percent Si, with the proviso that the total content of B and Si be at least 15 atom percent. Amorphous metal strip composed of an iron-boron-silicon alloy is also preferred. Most preferred is amorphous metal strip having a composition consisting essentially of about 11 atom percent boron and about 9 atom percent silicon, the balance being iron and incidental impurities. This strip, having a saturation induction of about 1.56 T and a resistivity of about 137 µΩ-cm, is sold by Honeywell International Inc. under the trade designation METGLAS® alloy 2605SA-1. Another suitable amorphous metal strip has a composition consisting essentially of about 13.5 atom percent boron, about 4.5 atom percent silicon, and about 2 atom percent carbon, the balance being iron and incidental impurities. This strip, having a saturation induction of about 1.59 T and a resistivity of about 137 µΩ-cm, is sold by Honeywell International Inc. under the trade designation METGLAS® alloy 2605SC. For applications in which even higher saturation induction is desired, strip having a composition consisting essentially of iron, along with about 18 atom percent Co, about 16 atom percent boron, and about 1 atom percent silicon, the balance being iron and incidental impurities, is suitable. Such strip is sold by Honeywell International Inc. under the trade designation METGLAS® alloy 2605CO. However, losses of a component constructed with this material tend to be slightly higher than those using METGLAS 2605SA-1.

As is known in the art, a ferromagnetic material may be characterized by its saturation induction or equivalently, by its saturation flux density or magnetization. The alloy suitable for use in the present invention preferably has a saturation induction of at least about 1.2 tesla (T) and, more preferably, a saturation induction of at least about 1.5 T. The alloy also has high electrical resistivity, preferably at least about 100 μΩ-cm, and most preferably at least about 130 μΩ-cm.

The mechanical and magnetic properties of the amorphous metal strip appointed for use in the component generally may be enhanced by thermal treatment at a temperature and for a time sufficient to provide the requisite enhancement without altering the substantially fully glassy microstructure of the strip. The heat treatment comprises a heating portion, an optional soak portion and a cooling portion. A magnetic field may optionally be applied to the strip during at least a portion, such as during at least the cooling portion, of the heat treatment. Application of a field, preferably substantially along the direction in which flux lies during operation of the given magnetic component, may in some cases further improve magnetic properties of the component and reduce its core loss. Optionally, the heat treatment comprises more than one such heat cycle. Furthermore, the one or more heat treatment cycles may be carried out at different stages of the component manufacture. For example, discrete laminations may be treated or the lamination stack may be heat treated either before or after adhesive bonding. Preferably, the heat treatment is carried out before bonding, since many otherwise attractive adhesives will not withstand the requisite heat treatment temperatures.

The thermal treatment of the amorphous metal may employ any heating means which results in the metal experiencing the required thermal profile. Suitable heating means include infra-red heat sources, ovens, fluidized beds, thermal contact with a heat sink maintained at an elevated temperature, resistive heating effected by passage of electrical current through the strip, and inductive (RF) heating. The choice of heating means may depend on the ordering of the required processing steps enumerated above.

The magnetic properties of certain amorphous alloys suitable for use in component may be significantly improved by heat treating the alloy to form a nanocrystalline microstructure. This microstructure is characterized by the presence of a high density of grains having average size less than about 100 nm, preferably less than 50 nm, and more preferably about 10-20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of the motor or inductive device. The heat treatment needed to produce the nanocrystalline structure in a given alloy must be carried out at a higher temperature or for a longer time than would be needed for a heat treatment designed to preserve therein a substantially fully glassy microstructure. As used herein the terms amorphous metal and amorphous alloy further include a material initially formed with a substantially fully glassy microstructure and subsequently transformed by heat treatment or other processing to a material having a nanocrystalline microstructure. Amorphous alloys which may be heat treated to form a nanocrystalline microstructure are also often termed, simply, nanocrystalline alloys. The present method allows a nanocrystalline alloy to be formed into the requisite geometrical shape of the finished bulk magnetic component. Such formation is advantageously accomplished while the alloy is still in its as-cast, ductile, substantially non-crystalline form, before it is heat treated to form the nanocrystalline structure which generally renders it more brittle and more difficult to handle.

Two preferred classes of alloy having magnetic properties significantly enhanced by formation therein of a nanocrystalline microstructure are given by the following formulas in which the subscripts are in atom percent.

A first preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8. After this alloy is heat treated to form a nanocrystalline microstructure therein, it has high saturation induction (e.g., at least about 1.5 T), low core loss, and low saturation magnetostriction (e.g. a magnetostriction having an absolute value less than $4 \times 10^{-6}$). Such an alloy is especially preferred for applications wherein a device of minimum size for the required power rating is demanded.

A second preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18. After this alloy is heat treated to form a nanocrystalline microstructure therein, it has a saturation induction of at least about 1.0 T, an especially low core loss, and low saturation magnetostriction (e.g. a magnetostriction having an absolute value less than $4 \times 10^{-6}$). Such an alloy is especially preferred for use in a component required to operate at a high excitation frequency (e.g. at 1000 Hz or more), such as in a very high speed motor or a high frequency inductor or transformer.

Bulk amorphous magnetic components will magnetize and demagnetize more efficiently than components made from other iron-base magnetic metals. In operation, the bulk amorphous metal component will generate less heat than a comparable component made from another iron-base magnetic metal when the two components are magnetized at identical induction and frequency. An electric motor using the bulk amorphous metal component can therefore be designed to operate: (i) at a lower operating temperature; (ii) at higher induction to achieve reduced size and weight; or (iii) at higher frequency to achieve reduced size and weight, or to achieve superior motion control, when compared to electric motors using components made from other iron-base magnetic metals.

It is a further advantage that a motor incorporating the bulk amorphous metal component of the invention can be designed with high pole count. The rotational speed of a motor is proportional to the ratio of electrical excitation frequency and pole count. The use of the low core loss component disclosed herein allows electrical excitation at a frequency that is much higher than would be possible in conventional motors using other known soft magnetic materials, given their higher core losses. As a result the designer is afforded much more freedom in the choice of pole count and excitation frequency for a given speed. A high pole count motor may be chosen which operates with acceptable core loss at maximum speed but which also retains acceptable power and torque performance over a wide range of excitation frequencies (and thus rotational speeds). In some applications this flexibility means that a load may be driven directly without need of a gearbox with its attendant complexity, need for service, and degradation of efficiency.

As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement the excitation is generally chosen such that the magnetic induction is homogeneous in the sample and varies sinusoidally with time at a frequency "f" and with a peak amplitude $B_{max}$. The core loss is then determined by known electrical measurement instrumentation and techniques. Loss is conventionally reported as watts per unit mass or volume of the magnetic material being excited. It is known in the art that loss increases monotonically with f and $B_{max}$. Most standard protocols for testing the core loss of soft magnetic materials used in components of motors {e.g. ASTM Standards A912-93 and A927 (A927M-94)} call for a sample of such materials which is situated in a substantially closed magnetic circuit, i.e. a configuration in which closed magnetic flux lines are completely contained within the volume of the sample. On the other hand, a magnetic material as employed in a motor component such as a rotor or a stator is situated in a magnetically open circuit, i.e. a configuration in which magnetic flux lines must traverse an air gap. Because of fringing field effects and non-uniformity of the field, a given material tested in an open circuit generally exhibits a higher core loss, i.e. a higher value of watts per unit mass or volume, than it would have in a closed-circuit measurement. The bulk magnetic component of the invention advantageously exhibits low core loss over a wide range of flux densities and frequencies even in an open-circuit configuration.

Without being bound by any theory, it is believed that the total core loss of the low-loss bulk amorphous metal component of the invention is comprised of contributions from hysteresis losses and eddy current losses. Each of these two contributions is a function of the peak magnetic induction $B_{max}$ and of the excitation frequency f. Prior art analyses of core losses in amorphous metals (see, e.g., G. E. Fish, J. Appl. Phys. 57, 3569(1985) and G. E. Fish et al., J. Appl. Phys. 64, 5370(1988)) have generally been restricted to data obtained for material in a closed magnetic circuit.

The total core loss $L(B_{max}, f)$ per unit mass of the bulk magnetic component of the invention may be essentially defined by a function having the form $$L(B_{max}, f) = c_1 f(B_{max})^n + c_2 f^q (B_{max})^m$$

wherein the coefficients $c_1$ and $c_2$ and the exponents n, m, and q must all be determined empirically, there being no known theory that precisely determines their values. Use of this formula allows the total core loss of the bulk magnetic component of the invention to be determined at any required operating induction and excitation frequency. It is generally found that in the particular geometry of many magnetic devices, especially motor rotors and stators, the magnetic field therein is not spatially uniform. Techniques such as finite element modeling are known in the art to provide an estimate of the spatial and temporal variation of the peak flux density that closely approximates the flux density distribution measured in an actual motor or generator. Using as input a suitable empirical formula giving the magnetic core loss of a given material under spatially uniform flux density, these techniques allow the corresponding actual core loss of a given component in its operating configuration to be predicted with reasonable accuracy by numerical integration over the component volume.

The measurement of the core loss of the magnetic component of the invention can be carried out using various methods known in the art. A method especially suited for measuring the present component may be described as follows. The method comprises forming a magnetic circuit with the magnetic component of the invention and a flux closure structure means. Optionally the magnetic circuit may comprise a plurality of magnetic components of the invention and a flux closure structure means. The flux closure structure means preferably comprises soft magnetic material having high permeability and a saturation flux density at least equal to the flux density at which the component is to be tested. Preferably, the soft magnetic material has a saturation flux density at least equal to the saturation flux density of the component. The flux direction along which the component is to be tested generally defines first and second opposite faces of the component. Flux lines enter the component in a direction generally normal to the plane of the first opposite face. The flux lines generally follow the plane of the amorphous metal strips, and emerge from the second opposing face. The flux closure structure means generally comprises a flux closure magnetic component which is constructed preferably in accordance with the present invention but may also be made with other methods and materials known in the art. The flux closure magnetic component also has first and second opposing faces through which flux lines enter and emerge, generally normal to the respective planes thereof. The flux closure component opposing faces are substantially the same size and shape to the respective faces of the magnetic component to which the flux closure component is mated during actual testing. The flux closure magnetic component is placed in mating relationship with its first and second faces closely proximate and substantially proximate to the first and second faces of the magnetic component of the invention, respectively. Magnetomotive force is applied by passing current through a first winding encircling either the magnetic component of the invention or the flux closure magnetic component. The resulting flux density is determined by Faraday's law from the voltage induced in a second winding encircling the magnetic component to be tested. The applied magnetic field is determined by Ampère's law from the magnetomotive force. The core loss is then computed from the applied magnetic field and the resulting flux density by conventional methods.

Figure 6:
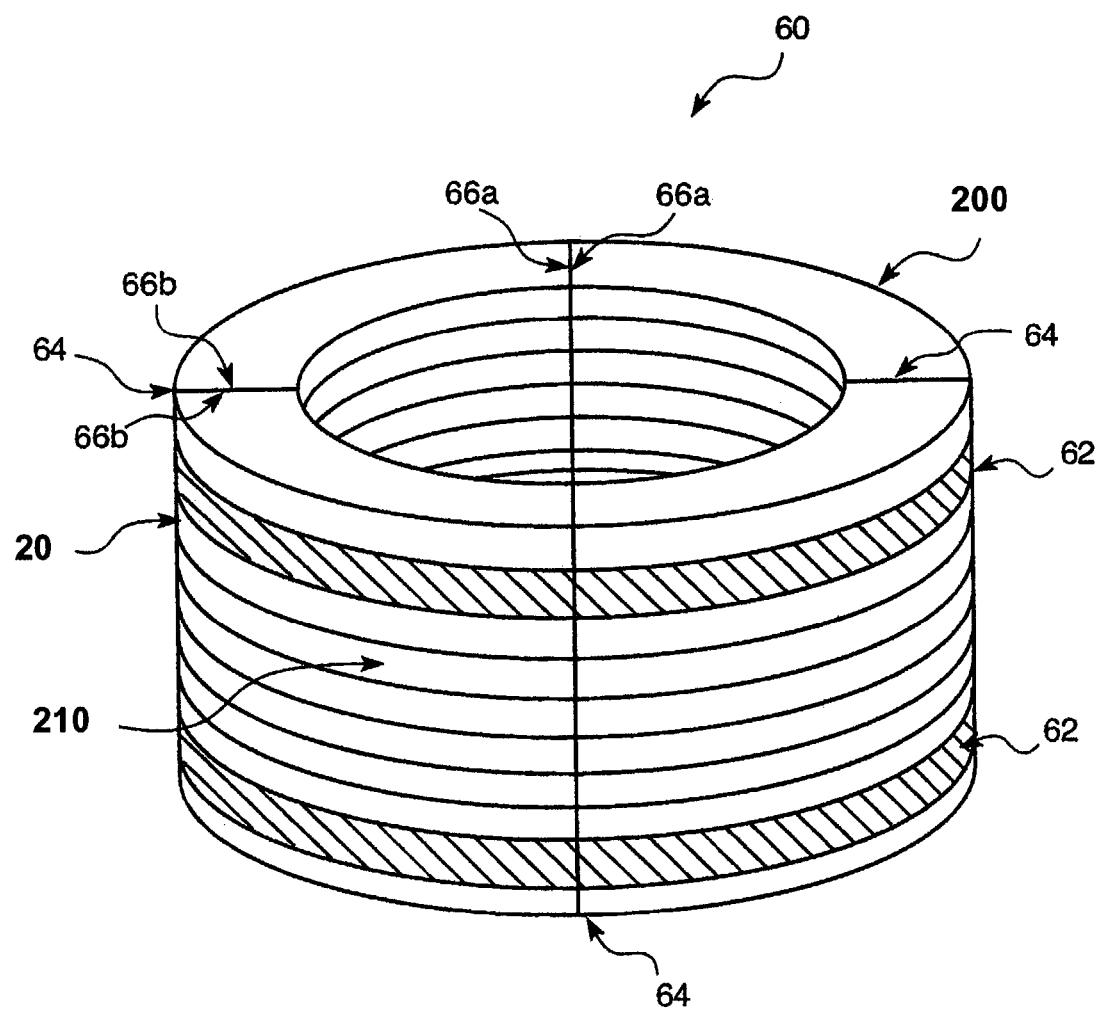
FIG. 6 is a perspective view of an assembly for testing bulk amorphous metal magnetic components, comprising four components, each having the shape of a polyhedron with oppositely disposed arcuate surfaces, and assembled to form a generally right circular, annular cylinder.

Referring to FIG. 6, there is illustrated an assembly 60 for carrying out one form of the testing method described above which does not require a flux closure structure means. Assembly 60 comprises four arcuate bulk amorphous metal magnetic components 200 of the invention. Each of the components 200 is a substantially identical right circular, annular, cylindrical segment subtending a 90° arc with arcuate surfaces 210 of the form depicted in FIG. 4B. Each component has a first opposite face 66a and a second opposite face 66b. The components 200 are situated in mating relationship to form assembly 60 which generally has the shape of a right circular cylinder. First opposite face 66a of each component 200 is located proximate to, and generally aligned parallel with, the corresponding first opposite face 66a of the component 200 adjacent thereto. The four sets of adjacent faces of components 200 thus define four gaps 64 equally spaced about the circumference of assembly 60. The mating relationship of components 200 may be secured by bands 62. Assembly 60 forms a magnetic circuit with four permeable segments (each comprising one component 200) and four gaps 64. Two copper wire windings (not shown) are toroidally threaded through the assembly 60. An alternating current of suitable magnitude is passed through the first winding to provide a magnetomotive force that excites assembly 60 at the requisite frequency and peak flux density. The resulting flux lines are generally within the plane of strips 20 and directed circumferentially. Voltage indicative of the time varying flux density within each of components 200 is induced in the second winding. The total core loss is determined by conventional electronic means from the measured values of voltage and current and apportioned equally among the four components 200.

Figure 7A:
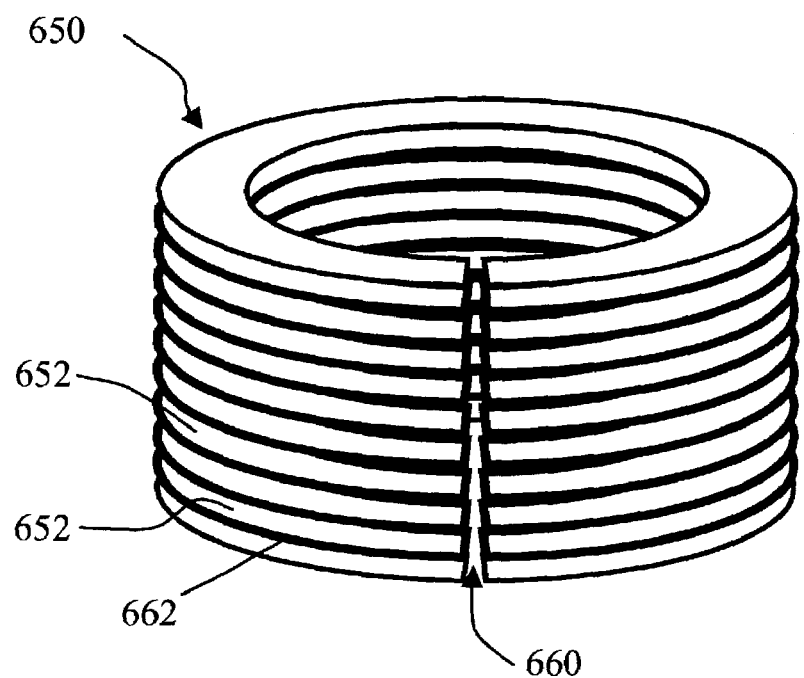
FIG. 7A is a perspective view depicting a bulk magnetic component in the form of a gapped, toroidal core used in constructing the inductive device of the invention.
Figure 7B:
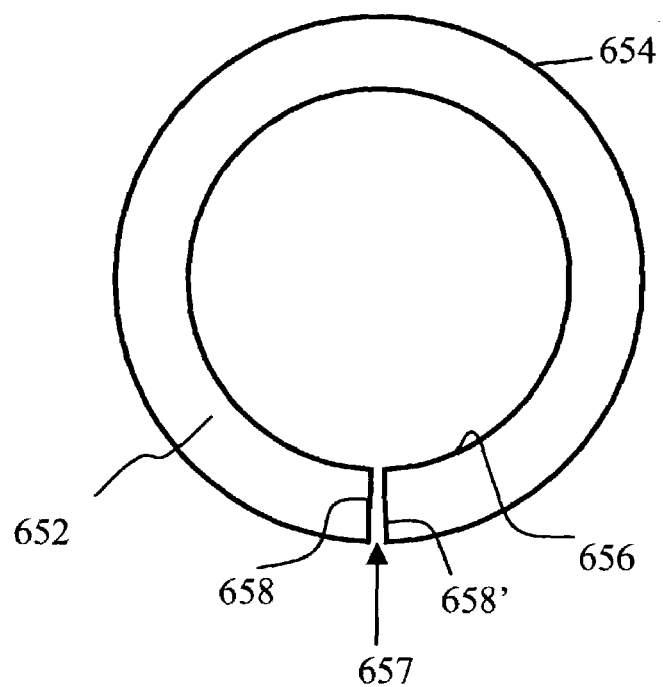
FIG. 7B is a plan view depicting a lamination selectively etched from amorphous metal strip material for incorporation in the component depicted by FIG. 7A.

In another aspect of the invention, the low-loss bulk amorphous metal magnetic component is beneficially incorporated in an inductive device. Referring in detail to FIG. 7A, there is shown an inductive device of the invention comprising a magnetic core 650 comprising a single bulk amorphous metal component in the shape of a toroid with an included air gap 660. As best visualized in FIG. 7B, a plurality of planar layers 652 having substantially similar shape are cut from amorphous metal strip. The layers are then stacked, registered, and bonded with an adhesive agent. That is to say, layers 652 are positioned so that their respective inside and outside edges 656, 654 and slots 657 are generally aligned to form smooth, generally cylindrical inside and outside surfaces. Such registration may be carried out as each layer 652 is sequentially added to the stack. Alternatively, the layers may be aligned as a group after completion of stacking. The aligned slots collectively form air gap 660 in which a spacer (not depicted) is optionally inserted between faces 658 and 658'.

Each of the layers has a generally annular shape with an outside edge 654 and an inside edge 656. A slot 657 extending from outside edge 654 to inside edge 656 is formed in each layer 652. The width of slot 657 is selected so a suitable demagnetizing factor is attained in finished core 650. The layers 652 are bonded by an adhesive agent, preferably by impregnation with a low viscosity epoxy 662. In the aspect depicted, the layers are circular annuli, but other non-circular shapes are also possible, for example oval, racetrack, and square and rectangular picture frame-like shapes of any aspect ratio. The inside or outside vertices of the layers in any of the embodiments are optionally radiused. Slot 657 is shown as being radially directed, but it may also be formed in any orientation that extends from inside edge 656 to outside edge 654. In addition, slot 657 may be formed in a generally rectangular shape as depicted, or it may be tapered or contoured to achieve other desired effects on the B-H loop of the core. The construction of the inductive device of the invention further includes provision of at least one toroidal winding (not shown) on the core.

The selective etching process of the invention is especially preferred for fabricating small parts, since it is relatively easily automated and affords tight, reproducible dimensional control of the finished layers. Such control, in turn, allows large-scale production of cores comprising uniformly sized laminations and thereby having well-defined and uniform magnetic properties. The present fabrication methods afford a further advantage over tape-wound core structures, in that compressive and tensile stresses that result inherently from bending strip into a spiral structure are absent in a flat lamination. Any stress resulting from cutting, punching, etching, or the like, will likely be confined merely to a small region at or near the periphery of an individual lamination.

In another aspect of the invention, similar fabrication processes are used to form layers that are incorporated in bulk amorphous metal magnetic components that may have overall shapes generally similar to those of certain block letters such as "C," "U," "E," and "I" by which they are identified. Each of the components comprises a plurality of planar layers of amorphous metal. The layers are stacked to substantially the same height and packing density, registered, and bonded together to form the components for the inductive device of the invention. Multiple-component embodiments of the present device are assembled by securing the components in adjacent-relationship with a securing means, thereby forming at least one magnetic circuit. In the assembled configuration the layers of amorphous metal strip in all of the components lie in substantially parallel planes. Each of the components has at least two mating faces that are brought proximate and parallel to a like number of complementary mating faces on other components. Some of the shapes, e.g. C, U, and E shapes, terminate in mating faces that are generally substantially co-planar. The I (or rectangular prismatic) shape may have two parallel mating faces at its opposite ends or one or more mating faces on its long sides, or both. Preferably the mating faces are substantially perpendicular to the planes of the constituent ribbons in the component to minimize core loss. Some embodiments of the invention further comprise bulk magnetic components having mating faces that are mitered relative to the elongated direction of features of the component.

In some embodiments of the invention two magnetic components, each having two mating faces, are used when forming the inductive device with a single magnetic circuit. In other aspects the components have more than two mating faces or the devices have more than two components; accordingly, some of these embodiments also provide more than one magnetic circuit. As used herein, the term magnetic circuit denotes a path along which continuous lines of magnetic flux are caused to flow by imposition of a magnetomotive force generated by a current-carrying winding encircling at least a part of the magnetic circuit. A closed magnetic circuit is one in which flux lies exclusively within a core of magnetic material, while in an open circuit part of the flux path lies outside the core material, for example traversing an air gap or a non-magnetic spacer between portions of the core. The magnetic circuit of the device of the invention is preferably relatively closed, the flux path lying predominantly within the magnetic layers of the components of the device but also crossing at least two air gaps between the proximate mating faces of the respective components. The openness of the circuit may be specified by the fraction of the total magnetic reluctance contributed by the air gaps and by the magnetically permeable core material. Preferably, the magnetic circuit of the present device has a reluctance to which the gap contribution is at most ten times that of the permeable components.

Optionally the fabrication of the component includes a step of preparing mating faces on the component, the faces being substantially planar and perpendicular to the constituent layers. If necessary, preparing the faces may comprise a planing operation to refine the mating faces and remove any asperities or non-planarity. The planing preferably comprises at least one of milling, surface grinding, cutting, polishing, chemical etching, and electrochemical etching, or similar operation, to provide a planar mating surface. The planing step is especially preferred for mating faces located on the side of a component to counter any effects of imperfect registration of the amorphous metal layers.

Figure 8:
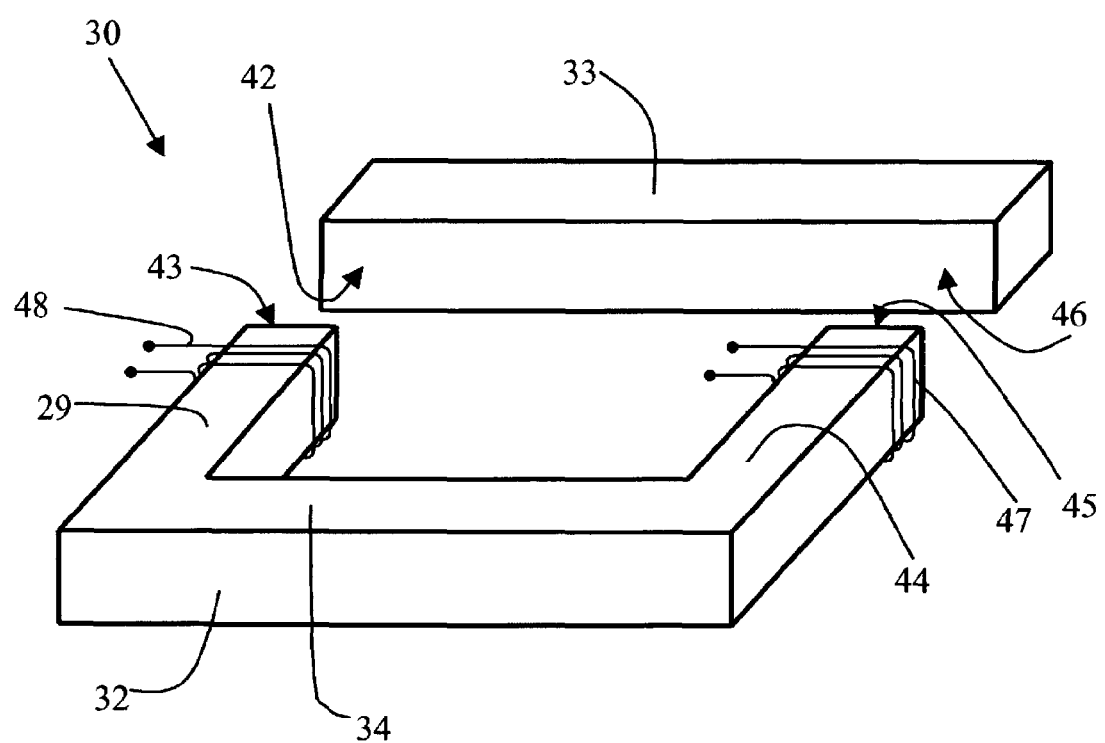
FIG. 8 is a perspective view depicting an inductive device of the invention having a "C-I" shape assembled using bulk amorphous metal magnetic components having "C" and "I" shapes.

Referring in detail to FIG. 8, there is depicted generally one form of a "C-I" shaped inductive device 30 of the invention comprising a "C"-shaped magnetic component 32 and an "I"-shaped magnetic component 33. "C" component 32 further includes first side leg 29 and second side leg 44, each extending perpendicularly from a common side of back portion 34 and terminating distally in a first rectangular mating face 43 and a second rectangular mating face 45, respectively. The mating faces are generally substantially coplanar. Side legs 29, 44 depend from opposite ends of the side of back portion 34. "I" component 33 is a rectangular prism having a first rectangular mating face 42 and a second rectangular mating face 46, both of which are located on a common side of component 33. The mating faces 42, 46 have a size and spacing therebetween complementary to that of the respective mating faces 43, 45 at the ends of legs 29, 44 of component 32. Each of the side legs 29, 44, back portion 34 between the side legs, and I component 33 has a generally rectangular geometric cross-section, all of which preferably have substantially the same height, width, and effective magnetic area. By effective magnetic area is meant the area within the geometric cross-section occupied by magnetic material, which is equal to the total geometric area times the lamination fraction. As is known in the art, one or more windings may be applied to the components of device 30, such as windings 47 and 48 on the respective legs 29, 44 of C-component 32. Alternatively, windings may be placed on I-component 33 in an embodiment not shown.

Figure 9:
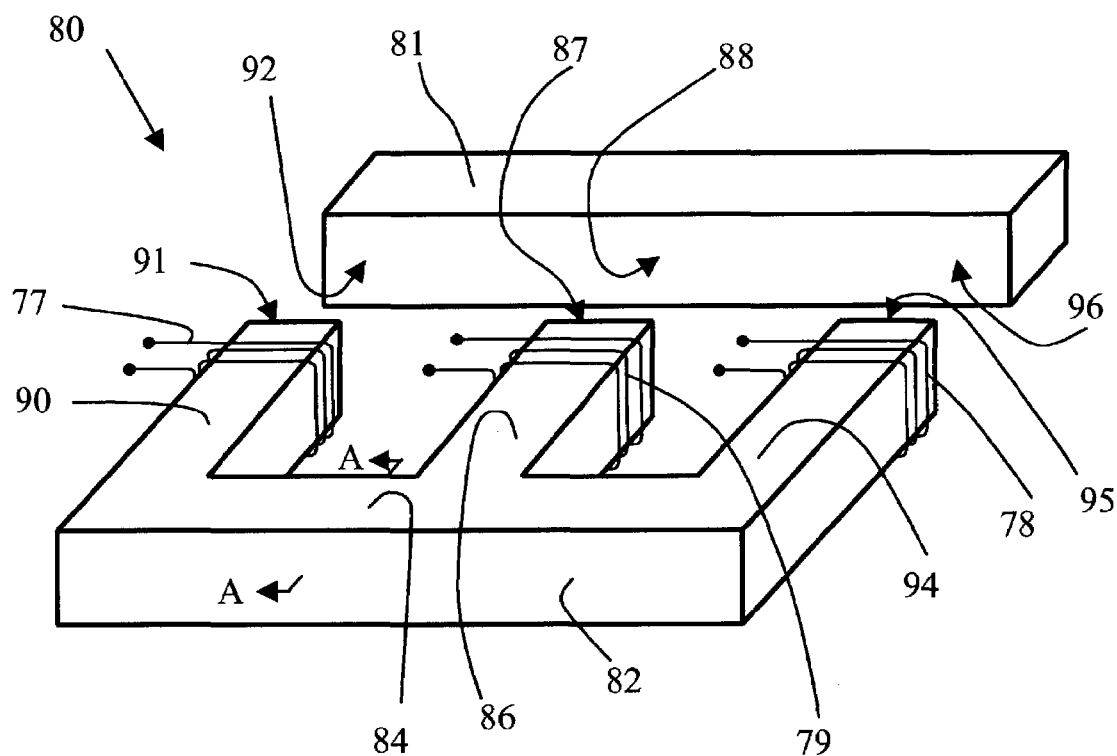
FIG. 9 is a perspective view depicting an inductive device of the invention having an "E-I" shape assembled using bulk amorphous metal magnetic components having "E" and "I" shapes and a winding disposed on each of the legs of the "E" shape.
Figure 10:
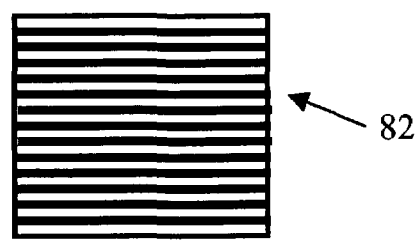
FIG. 10 is a cross-section view illustrating a portion of the device shown by FIG. 9.
Figure 11:
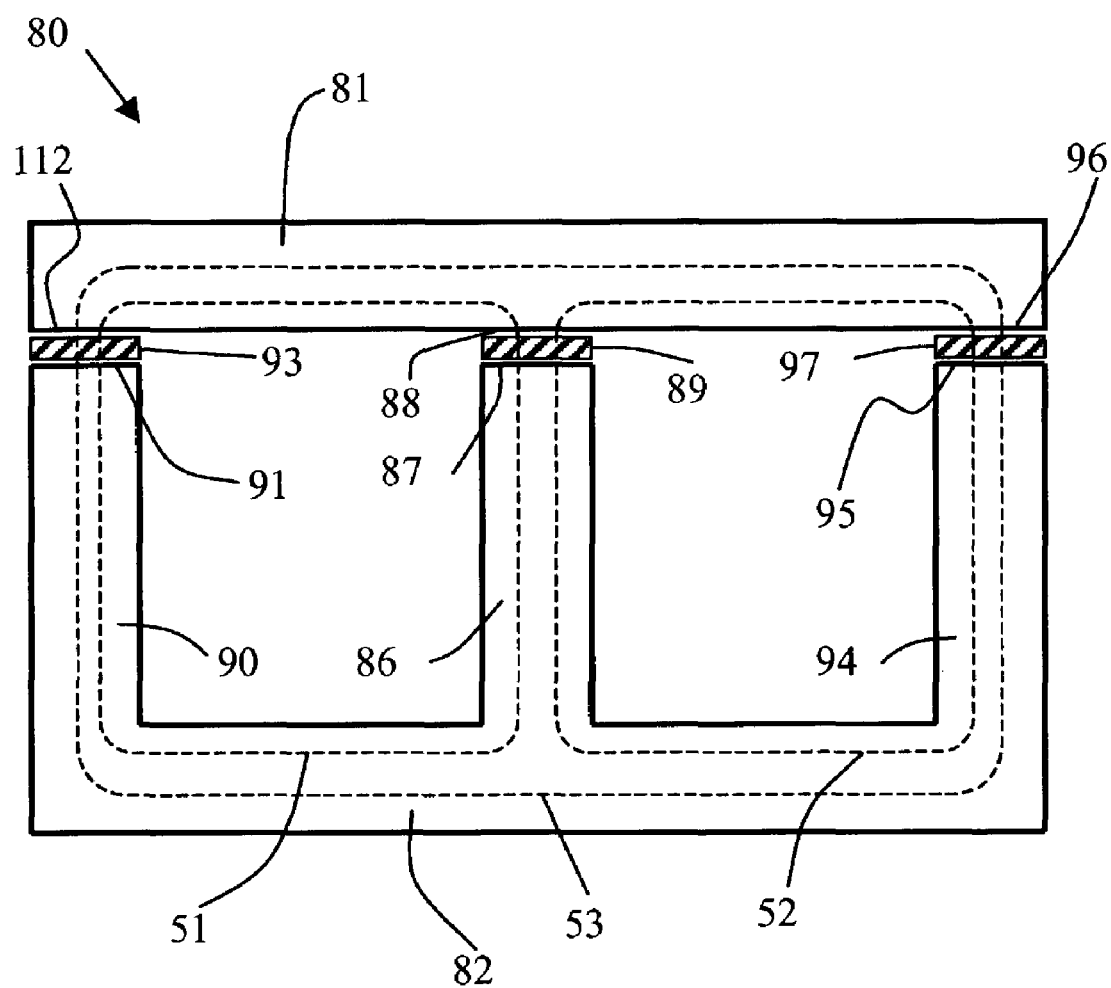
FIG. 11 is a plan view showing an "E-I" shaped inductive device of the invention comprising "E" and "I" shaped bulk amorphous metal magnetic components assembled with air gaps and spacers between the mating faces of the respective components.

FIGS. 9-11 depict aspects of the invention that provide an "E-I" device 80 including constituent components having "E" and "I" shapes. E component 82 comprises a plurality of layers prepared from ferromagnetic metal strip. Each layer has a substantially identical E-shape. The layers are bonded together to form E component 82 substantially uniform in thickness and having a back portion 84 and a central leg 86, a first side leg 90, and a second side leg 94. Each of central leg 86 and side legs 90, 94 extends perpendicularly from a common side of back portion 84 and terminates distally in a rectangular face 87, 91, 95, respectively. Central leg 86 depends from the center of back portion 84, while side legs 90, 94 depend respectively from opposite ends of the same side of back portion 84. The lengths of central leg 86 and side legs 90, 94 are generally substantially identical so that the respective faces 87, 91, 95 are substantially co-planar. As depicted by FIG. 10, the cross-section A-A of the back portion 84 between central leg 86 and either of side legs 90, 94 is substantially rectangular with a thickness defined by the height of the stacked layers and a width defined by the width of each layer. Preferably the width of back portion 84 in cross-section A-A is chosen to be at least as wide as any of the faces 87, 91, 95.

I component 81 has a rectangular prismatic shape and comprises a plurality of layers prepared using the same ferromagnetic metal strip as the layers in E component 82. The layers are bonded together to form I component 81 with a substantially uniform thickness. I component 81 has a thickness and a width which are substantially equal to the thickness and width of back portion 84 at section A-A and a length substantially identical to the length of E component 82 measured between the outside surfaces of the side legs 90, 94. On one side of I component 81 at its center is provided a central mating face 88, while a first end mating face 92 and a second end mating face 96 are located at opposite ends of the same side of component 81. Each of mating faces 87, 91, 95 is substantially identical in size to the complementary faces 88, 92, 96, respectively.

As further depicted by FIGS. 9 and 11, the assembly of device 80 comprises (i) providing one or more electrical windings, such as windings 77, 78, 79, encircling one or more portions of components 82 or 81; (ii) aligning E component 82 and I component 81 in close proximity and with all the layers therein being in substantially parallel planes; and (iii) mechanically securing components 81 and 82 in juxtaposed relationship. Components 82 and 81 are aligned such that faces 87 and 88, 91 and 92, and 95 and 96, respectively, are in proximity. The spaces between the respective faces define three air gaps with substantially identical thickness. Spacers 89, 93, and 97 are optionally placed in these gaps to increase the reluctance and the energy storage capacity of each of the magnetic circuits in device 80. Alternatively, the respective faces may be brought into intimate mating contact to minimize the air gaps and increase the initial inductance.

The "E-I" device 80 may be incorporated in a single phase transformer having a primary winding and a secondary winding. In one such implementation winding 79 serves as the primary and windings 77 and 78 connected in series-aiding serve as the secondary. In this implementation it is preferred that the width of each of side legs 90 and 94 be at least half the width of center leg 86.

The implementations in FIGS. 9-11 provide three magnetic circuits schematically having paths shown as dotted lines 51, 52, and 53 in "E-I" device 80. As a result, device 80 may be used as a three-phase inductor, with each of the three legs bearing a winding for one of the three phases. In still another implementation "E-I" device 80 may be used as a three-phase transformer, with each leg bearing both the primary and secondary windings for one of the phases. In most implementations of an E-I device intended for use in a three-phase circuit it is preferred that the legs 86, 90, and 94 be of equal width to balance the three phases better. In certain specialized designs, the different legs may have different cross-sections, different gaps, or different numbers of turns. Other forms suitable for various polyphase applications will be apparent to those having ordinary skill in the art.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Preparation and Testing of an Amorphous Metal Stator

Laminations for an amorphous metal stator for an inside-out spindle drive electric motor are cut by a selective etching process from $Fe_{80}B_{11}Si_9$ amorphous metal ribbon about 22 μm thick. Each lamination comprises a central annular region having a generally toroidal shape and a plurality of teeth extending radially outward from the central annular region as depicted generally by FIG. 5D. The annular region has approximate inside and outside diameters of about 9 and 11 mm, respectively. The outside diameter of the component measured at the periphery of the teeth is about 25 mm. The laminations are heat-treated at a temperature of 350–400° C. for 0.5–3 h to enhance the soft magnetic properties thereof. About 120 laminations are then stacked to form a generally cylindrical structure having a height of about 4.2 mm. The stack is immersed in a low viscosity, heat-activated epoxy which is allowed to impregnate and infiltrate the spaces between adjacent laminations. The epoxy used is Epoxylite™ 8899, diluted 1:5 by volume with acetone to achieve a suitable viscosity. The stack is held in registry in a fixture and compressed slightly to a height of about 4 mm to enhance the packing density of the stack. The impregnated stack is then exposed to a temperature of about 177° C. for approximately 2.5 hours to activate and cure the epoxy resin solution. After cooling the stack is removed from the fixture and electrophoretically coated with 3M ScotchCast™ Electrical Resin 5133 to form a stator suitable for use in an inside-out motor.

The magnetic properties of the stator are tested by affixing primary and secondary electrical windings encircling the central annular region. The primary winding is excited by a source of AC current of the requisite frequency and amplitude; the maximum flux density achieved is calculated from the induced voltage appearing across the secondary winding assuming the flux is carried completely in the central annular region, effectively neglecting any flux carried in the teeth near their root. The excitation is adjusted to provide a series of test points of defined frequency and flux density. Core loss is determined with a Yokogawa 2532 wattmeter.

The stator core in this embodiment exhibits advantageously low core losses over a range of frequencies extending from DC up to at least 2 kHz. Notably, the losses at 50 Hz (0.05 kHz) are about 0.21 W/kg at 1.0 T; at 400 Hz (0.4 kHz) the losses are about 1.6 W/kg at 1.0 T and 2.8 W/kg at 1.3 T; at 800 Hz (0.8 kHz) the losses are about 3.3 W/kg at 1.0 T and 5.7 W/kg at 1.3 T; and at 2000 Hz (2 kHz) the losses are about 9.5 W/kg at 1.0 T and 14.8 W/kg at 1.3 T.

It is further noted that the loss behavior of the stator core may be described using a function of the form $L(B_{max}, f) = c_1 f(B_{max})^n + c_2 f^q(B_{max})^m$. In particular, the losses of the stator are less than the values predicted using a function $L=0.005 f(B_{max})^{1.5} + 0.000012 f^{1.5}(B_{max})^{1.6}$.

The low values of core loss achieved render the stator core especially suited for use in a high rotational speed motor in which the electrical frequency may be as high as 1-2 kHz or more.

EXAMPLE 2

Preparation of a Nanocrystalline Alloy Rectangular Prism

Laminations for a stator of an inside-out spindle drive motor are prepared by photoetching $Fe_{73.5}Cu_1Nb_3B_9Si_{13.5}$ amorphous metal ribbon, approximately 30 mm wide and 0.018 mm thick. Each lamination comprises a central annular region having a generally toroidal shape and a plurality of teeth extending radially outward from the central annular region as depicted generally by FIG. 5D. The annular region has approximate inside and outside diameters of about 9 and 11 mm, respectively. The outside diameter of the component measured at the periphery of the teeth is about 25 mm. The laminations are heat treated to form a nanocrystalline microstructure in the amorphous metal. The anneal is carried out by performing the following steps: 1) heating the parts up to 580° C.; 2) holding the temperature at approximately 580° C. for approximately 1 hour; and 3) cooling the parts to ambient temperature. About 160 of the heat-treated laminations are then stacked to form a generally cylindrical structure having a height of about 4.2 mm and immersed in a low viscosity, heat-activated epoxy which is allowed to impregnate and infiltrate the spaces between adjacent laminations. The epoxy used is Epoxylite™ 8899 diluted 1:5 by volume with acetone to achieve a suitable viscosity. The stack is held in registry in a fixture and compressed slightly to a height of about 4 mm to enhance the packing density of the stack. The impregnated stack is then exposed to a temperature of about 177° C. for approximately 2.5 hours to activate and cure the epoxy resin solution. After cooling the stack is removed from the fixture and electrophoretically coated with 3M ScotchCast™ Electrical Resin 5133 to form a stator suitable for use in an inside-out motor.

The magnetic properties of the stator are tested by affixing primary and secondary electrical windings encircling the central annular region. The primary winding is excited by a source of AC current of the requisite frequency and amplitude; the maximum flux density achieved is calculated from the induced voltage appearing across the secondary winding assuming the flux is carried completely in the central annular region, effectively neglecting any flux carried in the teeth near their root. The excitation is adjusted to provide requisite test points of defined frequency and flux density determined in accordance with the aforementioned approximation. Core loss is determined with a Yokogawa 2532 wattmeter.

The nanocrystalline alloy stator exhibits low core losses. Notably, the losses at 50 Hz (0.05 kHz) are about 0.21 W/kg at 1.0 T; at 400 Hz (0.4 kHz) the losses are about 1.6 W/kg at 1.0 T and 2.8 W/kg at 1.3 T; at 800 Hz (0.8 kHz) the losses are about 3.3 W/kg at 1.0 T and 5.7 W/kg at 1.3 T; and at 2000 Hz (2 kHz) the losses are about 9.5 W/kg at 1.0 T and 14.8 W/kg at 1.3 T. As a result, the stator is rendering it suitable for use in a high speed, high efficiency electric motor.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A low-loss bulk amorphous metal magnetic component for an electric motor, comprised of a plurality of substantially similarly shaped layers etched from amorphous metal strips to desired shapes and laminated together to form a stack, and annealed, wherein the annealed stack is coated with an adhesive agent to form a polyhedrally shaped part wherein the layers are bonded, said low-loss bulk amorphous metal magnetic component, when operated at an excitation frequency "f" to a peak induction level $B_{max}$, having a core-loss less than about "L", wherein L is given by the formula $L=0.005 f(B_{max})^{1.5} + 0.000012 f^{1.5}(B_{max})^{1.6}$, the core loss, excitation frequency and peak induction level being measured in watts per kilogram, hertz, and teslas, respectively.

2. A magnetic component as recited by claim 1, each of said amorphous metal strips having a composition defined essentially by the formula: $M_{70-85}Y_{5-20}Z_{0-20}$, subscripts in atom percent, where "M" is at least one of Fe, Ni and Co, "Yin" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta and W, and (ii) up to 10 atom percent of components (Y+Z) can be replaced by at least one of the non-metallic species In, Sn, Sb and Pb.

3. A magnetic component as recited by claim 2, wherein said M component is substantially Fe, said Y component is substantially B, and said Z component is substantially Si.

4. A magnetic component as recited by claim 2, wherein each of said ferromagnetic amorphous metal strips has a composition containing at least 70 atom percent Fe, at least 5 atom percent B, and at least 5 atom percent Si, with the proviso that the total content of B and Si is at least 15 atom percent.

5. A magnetic component as recited by claim 4, wherein each of said strips has a composition defined essentially by the formula $Fe_{80}B_{11}Si_9$.

6. A magnetic component as recited by claim 2, said amorphous metal strips having been heat treated to form a nanocrystalline microstructure therein.

7. A magnetic component as recited by claim 6, wherein each of said amorphous metal strips has a composition defined essentially by the formula $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8.

8. A magnetic component as recited by claim 6, wherein each of said amorphous metal strips has a composition defined essentially by the formula $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18.

9. A magnetic component as recited by claim 1, comprising at least part of a stator of an electric motor.

10. A magnetic component as recited by claim 1, comprising at least part of a rotor of an electric motor.

11. A magnetic component as recited by claim 1, having a core-loss of less than or approximately equal to 2.8 watt-per-kilogram of amorphous metal material when operated at a frequency of approximately 400 Hz and a flux density of approximately 1.3 T.

12. A magnetic component as recited by claim 1, having a core-loss of less than or approximately equal to 5.7 watts-per-kilogram of amorphous metal material when operated at a frequency of approximately 800 Hz and a flux density of approximately 1.3 T.

13. A magnetic component as recited by claim 1, having a core-loss of less than or approximately equal to 9.5 watts-per-kilogram of amorphous metal material when operated at a frequency of approximately 2,000 Hz and a flux density of approximately 1.0 T.

14. A magnetic component as recited by claim 1, wherein said adhesive agent is composed of at least one member selected from the group consisting of one and two part epoxies, varnishes, anaerobic adhesives, cyanoacrylates, and room-temperature-vulcanized (RTV) silicone materials.

15. A magnetic component as recited by claim 14, said component being impregnated with said adhesive agent.

16. A magnetic component as recited by claim 15, further comprising impregnant flow enhancement means for enhancing the bonding of the laminations.

17. A magnetic component as recited by claim 14, said adhesive agent being a low viscosity epoxy.

18. A low core loss, bulk amorphous metal magnetic component constructed by selectively etching amorphous metal strip material to form a plurality of laminations, each having a substantially identical pre-determined shape; stacking said laminations in registry to form a lamination stack and annealing; and c) adhesively bonding said lamination stack with an adhesive agent to form layers that are bonded, wherein said component when operated at an excitation frequency "f" to a peak induction level $B_{max}$ has a core-loss less than about "L" wherein L is given by the formula $L=0.005\ f(B_{max})^{1.5}+0.000012\ f^{1.5}(B_{max})^{1.6}$, said core loss, said excitation frequency and said peak induction level being measured in watts per kilogram, hertz, and teslas, respectively.

* * * * *

UNITED STATES PATENT AND TRADEMARK OFFICE
CERTIFICATE OF CORRECTION

PATENT NO. : 7,235,910 B2 Page 1 of 1
APPLICATION NO. : 10/423791
DATED : June 26, 2007
INVENTOR(S) : Nicholas J. Decristofaro et al.

It is certified that error appears in the above-identified patent and that said Letters Patent is hereby corrected as shown below:

Column 28, Line 64, change ""Yin"" to --"Y"--.

Signed and Sealed this

Thirteenth Day of May, 2008

JON W. DUDAS
*Director of the United States Patent and Trademark Office*